(12) United States Patent
Hibi et al.

(10) Patent No.: US 7,401,927 B2
(45) Date of Patent: Jul. 22, 2008

(54) METHOD OF ILLUMINATION AND DISPLAY APPARATUS

(75) Inventors: Taketoshi Hibi, Tokyo (JP); Yuzo Nakano, Tokyo (JP); Shinji Okamori, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 133 days.

(21) Appl. No.: 11/110,760

(22) Filed: Apr. 21, 2005

(65) Prior Publication Data

US 2005/0237490 A1 Oct. 27, 2005

(30) Foreign Application Priority Data

Apr. 23, 2004 (JP) .............................. 2004-127889

(51) Int. Cl.
G03B 21/14 (2006.01)
G02F 1/00 (2006.01)

(52) U.S. Cl. .............................. 353/37; 353/94; 348/759

(58) Field of Classification Search .................. 353/20, 353/28, 34, 37, 50, 51, 94, 98, 99; 348/746, 348/747, 759, 766, 770, 771, 792
See application file for complete search history.

(56) References Cited

U.S. PATENT DOCUMENTS

| | | | |
|---|---|---|---|
| 5,552,922 A | 9/1996 | Magarill | |
| 6,254,237 B1 | 7/2001 | Booth | |
| 6,447,120 B1 | 9/2002 | Hansen et al. | |
| 6,886,941 B2 * | 5/2005 | Janssen | 353/30 |
| 7,118,225 B2 * | 10/2006 | Penn | 353/84 |
| 2003/0107817 A1 * | 6/2003 | Dho | 359/634 |

FOREIGN PATENT DOCUMENTS

| | | |
|---|---|---|
| JP | 8-51633 A | 2/1996 |
| JP | 11-38365 A | 2/1999 |
| JP | 2002-268010 A | 9/2002 |
| JP | 2003-121922 A | 4/2003 |

* cited by examiner

Primary Examiner—Andrew T Sever
(74) Attorney, Agent, or Firm—Birch, Stewart, Kolasch & Birch, LLP

(57) ABSTRACT

A display apparatus displaying an image includes a light source, a light valve, a light cross-section converter and a light scanning mechanism. The light valve has a screen formed of a plurality of pixels. The light cross-section converter converts light emitted from the light source into illumination light having a cross section enough to illuminate at least one pixel at a time. The light scanning mechanism controls a direction of travel of the illumination light in such a way that the illumination light scans the plurality of pixels. The light scanning mechanism controls at least one of sequence, speed, and number of times of scanning where the illumination light scans the plurality of pixels, so that a desired profile of distribution of illuminance is obtained over an entire surface of the screen for a time period not longer than one frame time of an image.

21 Claims, 19 Drawing Sheets

ASPECT RATIO 16 : 9

ASPECT RATIO 4 : 3

METHOD OF ILLUMINATION AND DISPLAY APPARATUS

BACKGROUND OF THE INVENTION

1. Field of the Invention

The present invention generally relates to a display apparatus for displaying, for example, a television image. Moreover, the present invention relates to a method of illuminating a miniaturized light valve with light emitted from a light source, and to a display apparatus in which a light valve modulates the illumination light and then emits the modulated light to form an image.

2. Description of the Related Art

With a conventional projection type display apparatus, light is emitted from a light source and is incident on a light valve and the light valve modulates the incident light in accordance with an image to produce ON-light representative of an image dot. Then, the light valve emits the ON-light to a projection means, which projects the ON-light onto a screen or the like. The illumination light incident on the light valve illuminates the entire surface of the light valve to produce a desired uniform profile of distribution of illuminance across the entire surface of the light valve. In order to obtain a uniform profile of distribution of illuminance, for example, a beam of illumination light emitted from a light source is first directed to transmit through a light integrator in the form of a fly' eye lens sheet or an optical element of columnar structure. This allows the beam of illumination light to have a cross section analogous to the shape of the light valve before forming an image on the light valve.

ON-light emitted from a light valve is, for example, directed to transmit through a projection means to form an image on, for example, a screen. The image formed on the screen is diffused into the eyes of views. Illumination light incident on the light valve and light emitted from the light valve but not projected (referred to as "OFF-light" hereinafter) are unwanted light, i.e., stray light. If such stray light enters the ON-light, the stray light makes the image blurred. For this reason, a means is provided that allows only the ON-light to pass through. If the light valve takes the form of a micro mirror device, then ON-light and OFF-light travel in different paths and therefore a total reflection prism is used in which light is transmitted or not transmitted depending on the direction of travel of light (U.S. Pat. No. 5,552,922, FIG. 1). If the light valve takes the form of a transmission type liquid crystal element or reflection type liquid crystal element, then the ON-light and OFF-light travel in different paths and therefore a polarizing plate or a polarization split prism is employed, thereby allowing only the ON-light to be transmitted onto a projection means (Japanese Patent Application Laid-Open No. 11-38365, pages 5-6, FIG. 1).

When a color image such as television image is to be displayed, one or a plurality of light valves, for example, are used to form images of respective primary colors and combine the respective color images into a full color image. The use of a prism for combining light of the respective colors results in a large overall apparatus size (Japanese Patent Application Laid-Open No. 11-38365, pages 5-6, FIG. 1). For a system that does not require a color-combining prism, illumination light of three primary colors (red, green, and blue) illuminate a sheet of light valve in sequence (Japanese Patent Application Laid-Open No. 8-51633, pages 3-4, FIG. 4). In this case, the apparatus may be miniaturized without difficulty. For micro mirror elements and reflection type liquid crystal elements, display elements operate fast enough in switching between ON-light and OFF-light as compared to the frame time of an image to be displayed, so that the projected light of three primary colors can be switched from one color to another during one image frame and therefore images of the respective colors are sequentially formed in registration.

Another way of combining images of primary colors is implemented by an apparatus in which a single light valve is employed and filters of primary colors are disposed in such a way that a filter of one color is in series with a corresponding path of illumination light and dots of different colors are formed on a pixel-by-pixel basis of the light valve (U.S. Pat. No. 6,254,237, FIGS. 1 and 3). Some the conventional apparatus employ micro mirror elements but do not use a total reflection prism for separating ON-light from the rest (Japanese Patent Laid-Open No. 2002-268010, Page 4, FIG. 1). Further, some of the reflection type liquid crystal elements use a plate-like reflection type polarization means in place of a polarization split prism (U.S. Patent No. 2003-121922, FIG. 1 and FIG. 4).

Yet another conventional apparatus is of a laser scanning type in which an image signal intensity-modulates light emitted from a laser light source and a scanning means (galvanometer and mirror on page 209-223, FIGS. 5-61 in "Practical Laser Technique", by Toshimitsu Hirai, published by Kyoritsu Shuppan) causes the modulated light to scan on an object (e.g., screen) to form an image.

If conventional display apparatus are to be miniaturized in overall size or reduced in thickness, the apparatus suffer from the problems that the entire surface of a light valve can not be illuminated uniformly and noise enters the image to be displayed. A description will be given of causes of such problems as follows.

A display apparatus that uses a reflection light valve requires a light path for illumination light and a means for removing unwanted light, the light path and the means being provided near the light valve. The illumination light illuminates the light valve uniformly. The means for removing unwanted light allows ON-light to be viewed without noise. In order to implement these functions, glass prisms such as a total reflection prism (U.S. Pat. No. 5,552,922) and a polarization split prism (Japanese Patent Laid-Open No. 11-38365) are employed. These glass prisms are useful for telecentric illumination. In order to prevent noise from entering ON-light, it is necessary to prevent stray light from entering the path of the ON-light. For this purpose, a prism should have a volume large enough for enclosing the light path and thus it is difficult to implement a miniaturized display and a thin type display. A glass prism is made of a homogeneous glass material and processed through polishing and bonding, thus being relatively expensive and heavy. A projection type display incorporates a glass prism disposed between a light valve and a projection means (U.S. Pat. No. 5,552,922, FIG. 1 and Japanese Patent Application No. 11-38365, pages 5-6, FIG. 1). Thus, the back focal length of the projection means is long, making it difficult to design a projection means that is capable of projecting an image with a wide field angle while also maintaining good optical characteristics such as chromatic aberration. This is a barrier to a miniaturized display apparatus having a short projection distance. A display apparatus incorporating a plate-like polarization splitting means in place of a polarization split prism has an advantage of having a small weight as compared to apparatus incorporating prisms (U.S. Pat. No. 6,447,120, FIG. 1). However, because a medium that forms a light path from a light valve to a projection means is air except for the polarization splitting means, the effective back focal length of the projection means cannot be short. A conventional display apparatus according to Japanese Patent Application Laid-Open No. 2002-268010 (FIGS. 1 and 3) incorporates a lens and a mirror in place of a total reflection type prism, and suffers the problem that it is difficult to illuminate a light valve with a required uniform profile of distribution of illuminance.

A display (U.S. Pat. No. 6,254,237) that incorporates a transmission type light valve also requires an optical means such as a fly's eye lens for illuminating a light valve and a path for the light, and is therefore difficult to implement a further miniaturized display apparatus.

With a laser scanning type display, it is required that for displaying individual pixels properly, the image of a light source should be sufficiently small and the light source is sufficiently bright. Such a light source can only be implemented by a large size, expensive laser oscillator.

Image signals have a variety of aspect ratios. For example, a television signal has an aspect of either 16:9 or 4:3. A conventional light integrator is configured to emit illumination light having a predetermined cross-section and therefore a light valve is illuminated with a predetermined profile of distribution of illuminance. If an image to be displayed has an aspect ratio different from the shape of a light valve, some pixel areas on the light valve available for image formation are illuminated by the illumination light but not effectively used to display any image. In this case, such a portion of the illumination light not effectively used is OFF-light and represents about 20% in a total illuminated area, resulting in poor efficiency of light utilization.

SUMMARY OF THE INVENTION

The present invention was made in view of the aforementioned conventional problems.

An object of the present invention is to provide a method of displaying an image with desired illuminance.

Another object of the invention is to provide a display apparatus that uses the method of displaying an image with desired illuminance, is lightweight, and is reduced in thickness. Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein.

DETAILED DESCRIPTION OF THE INVENTION

First Embodiment

Construction

Figure 1:
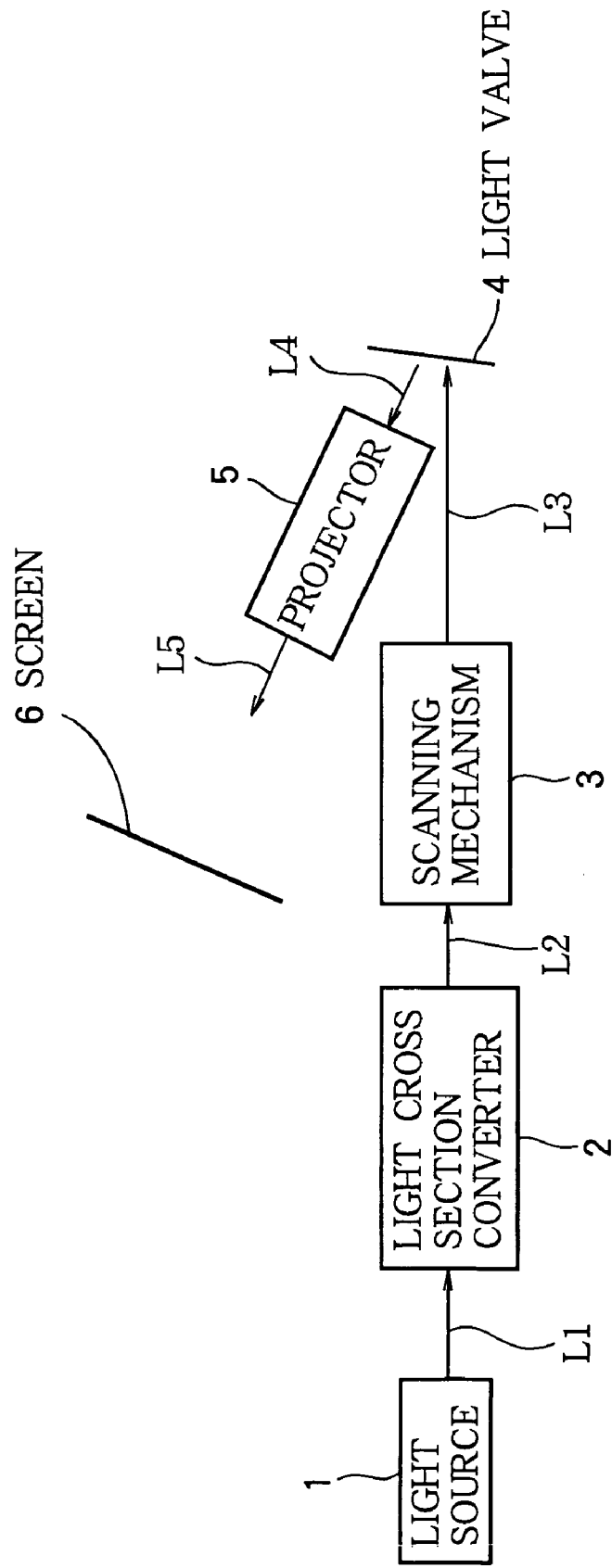
FIG. 1 illustrates a general configuration of a display apparatus according to a first embodiment.

FIG. 1 illustrates a general configuration of a display apparatus according to a first embodiment. A light source 1 is preferably a point source such that a large portion of light emitted from the light source reaches a light valve 4. Such a point source should have a short arc length and takes the form of an ultra high-pressure mercury lamp or a semiconductor laser. Light emitted from the light source 1 is condensed by a reflection plate or a condenser lens, both not shown, before it is incident as light L1 on a light cross section converter 2. The light cross-section converter 2 receives the light L1 through a conventional method (e.g., optical element of columnar structure in FIGS. 1 and 4 of Japanese Patent Laid-Open No. 2003-121922). Then, the light cross section converter 2 converts the light L1 into light L2 in a predetermined manner, the light L2 having a circular cross section with an intensity distribution of a Gaussian beam. The light cross section converter 2 then emits the light L2 to a scanning mechanism 3. The scanning mechanism 3 drives light. L3 in two axes in a predetermined sequence to scan the entire surface of the light valve 4 and is configured by a known method. For example, a conventional method may be used which is disclosed by "Practical Laser Technique" by Toshimitsu Hirai, published by Kyoritsu Shuppan Kabushiki Kaisha, galvanometer and mirror on page 209 and Table 5-3. Gaussian beam is such that a light intensity is given by $I(r)=Io \cdot EXP(-(r/r_o)^2)$ where r is a distance from the central axis of the beam of illumination light, Io is a light intensity at the central axis of the beam of illumination light, I(r) is a light intensity at a distance r, and $r_o$ is the radius of the beam of illumination light. The light L2 and L3 are transmitted through appropriate relay optical means, not shown, to the succeeding means. The scanning mechanism 3 is disposed at an optical conjugate point with respect to the light-exiting surface of the light cross-section converter 2, or close to the conjugate point. The light valve 4 has micro mirror elements or reflection type liquid crystal elements arranged in a two-dimension plane, each element representing a pixel and modulating the illumination light in accordance with an image signal to be displayed, thereby emitting light L4 (i.e., ON light). The light L4 is incident on a projector 5 through a transparent medium (e.g., air) and is projected as projection light L5 onto a screen 6.

Figure 2:
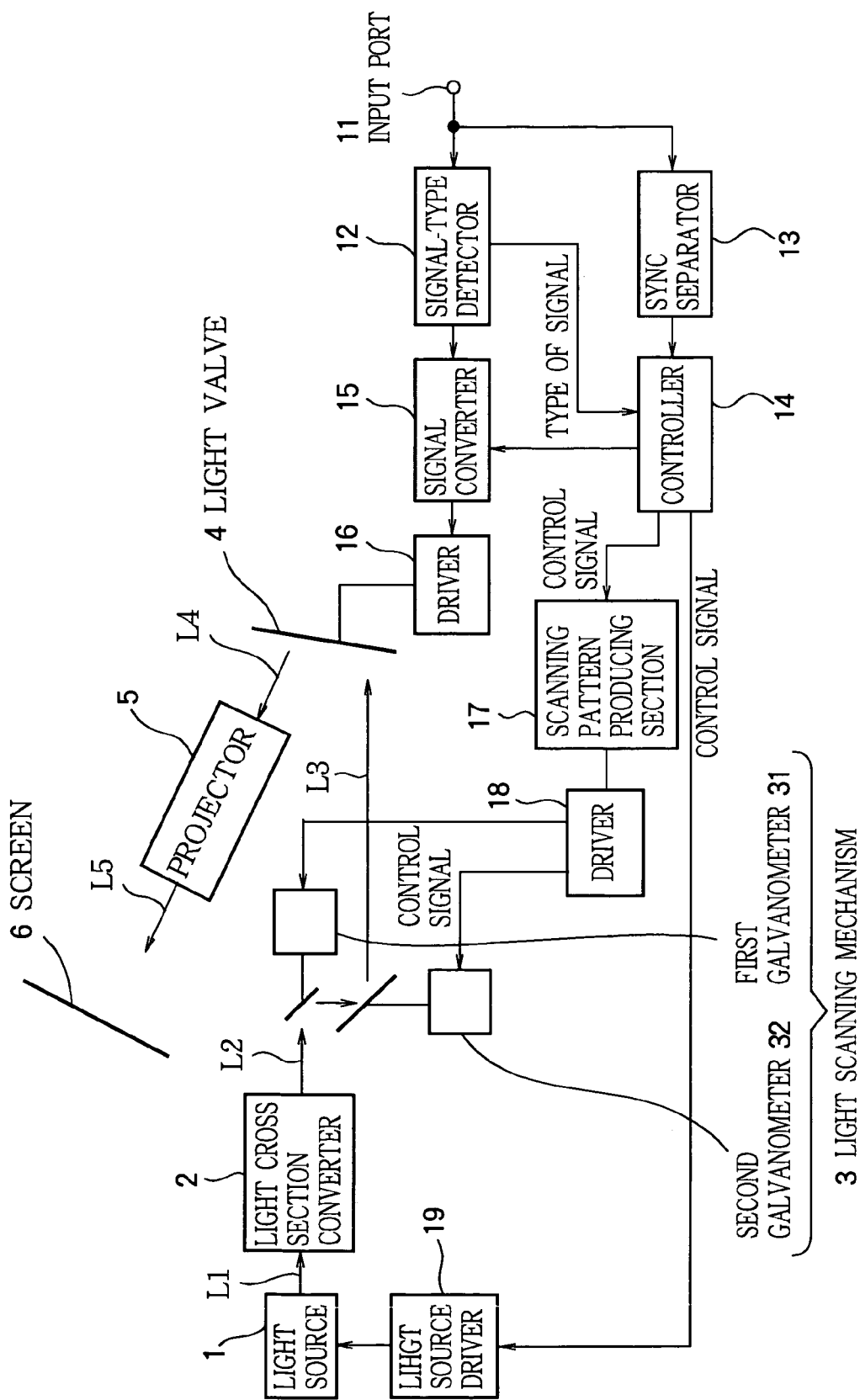
FIG. 2 is a block diagram illustrating the general configuration of the display apparatus according to the first embodiment.

FIG. 2 is a block diagram illustrating a general configuration of a display apparatus according to the first embodiment. An input port 11 receives signals such as a television signal and a monitor picture of a computer. A signal-type detector 12 detects the type of the input signal and provides the detection result to a controller 14. A sync separator 13 separates a vertical sync signal and a horizontal sync signal from the input signal and provides a reference timing for each frame of the image to the controller 14. Based on the type of the input signal, the reference timing and an operator's input signal, the controller 14 determines the aspect ratio and the profile of distribution of luminance used for displaying an image and outputs control signals to a signal converter 15, a scanning pattern producing section 17, and a light source driver 19. The signal converter 15 converts the data format of respective pixels and outputs image data of the image signal according to the image displaying system of the light valve 4, and the driver 16 drives the respective pixels of the light valve 4 to form the image. Under the control of the controller 14, the scanning pattern producing section 17 either produces a scanning pattern or reads the scanning pattern from a table, and outputs the scanning pattern to a driver 18 of the scanning mechanism 3. The driver 18 drives a first galvanometer 31 and a second galvanometer 32 to rotate mirrors fixed to the rotating shaft of the galvanometer 32, thereby causing the illumination light to scan in a two-dimension plane. The light source driver 19 drives the light source 1 to go on and go off, or adjusts luminance under the control of the controller 14.

Figure 3A:
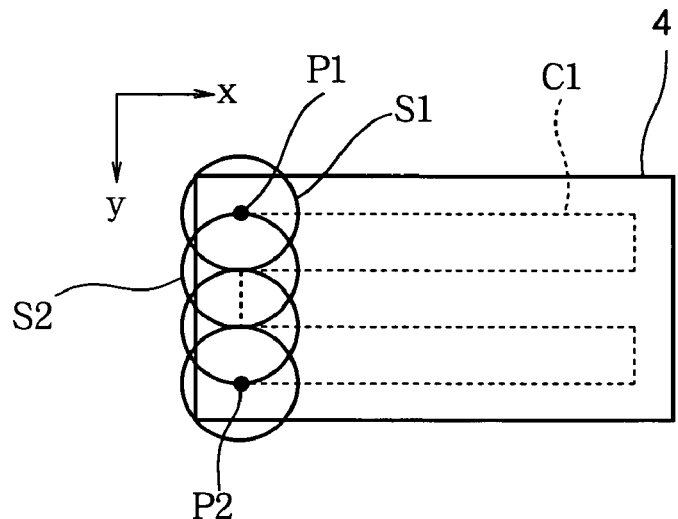
FIGS. 3A and 3B illustrate the sequence for the scanning mechanism 3 to illuminate the light valve for one frame of an image.
Figure 3B:
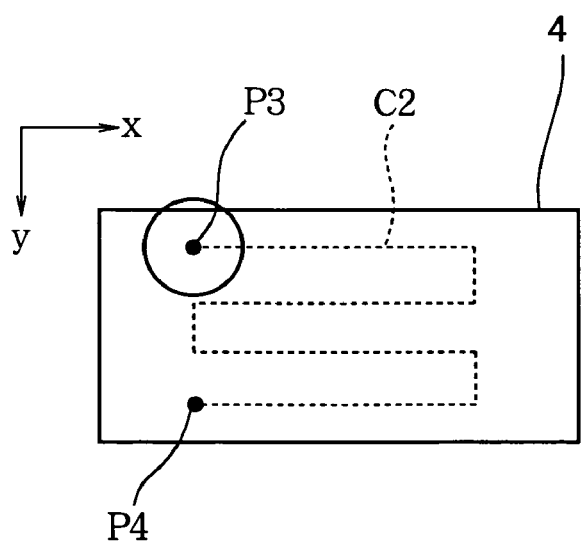

FIGS. 3A and 3B illustrate the sequence for the scanning mechanism 3 to illuminate the light valve 4 for one frame of an image. FIG. 3A illustrates the scanning sequence when an image having an aspect ratio of 16:9 is displayed. FIG. 3B illustrates the scanning sequence when an image having an aspect ratio of 4:3 is displayed. Referring to FIG. 3A, P1 indicates a point at which the scanning begins and P2 indicates a point at which the scanning ends. S1 and S2 are areas illuminated by illumination light having a circular cross section with a Gaussian radius ro. These illuminated areas S1 and S2 move on the light valve 4, thereby scanning the light valve 4. The dotted line C1 represents a scanning locus of the illumination light from the point P1 to the point P2. The first galvanometer 31 causes the illumination light to scan the light valve 4 in the X direction and the second galvanometer 32 causes the illumination light to scan the light valve 4 in the Y direction. Because the galvanometer is capable of responding as fast as about one millisecond ("Practical Laser Technique" by Toshimitsu Hirai), the light valve 4 can be scanned in a predetermined manner in 16 to 32 milliseconds, which is the frame time of an image. At the end of one frame, the light source 1 is turned off, the scanning position jumps from P2 to P1, and then the light source 1 is turned on again to begin to display the next frame of the image. FIG. 3B illustrates the sequence for displaying an image having an aspect ratio of 4:3. The illumination light starts scanning at a point P3, continues to scan along a scanning locus C2, and ends at a point P4. In FIG. 3B, the beam of illumination light does not illuminate left and right peripheral portions of the light valve 4, improving efficiency of light utilization.

Figure 4A:
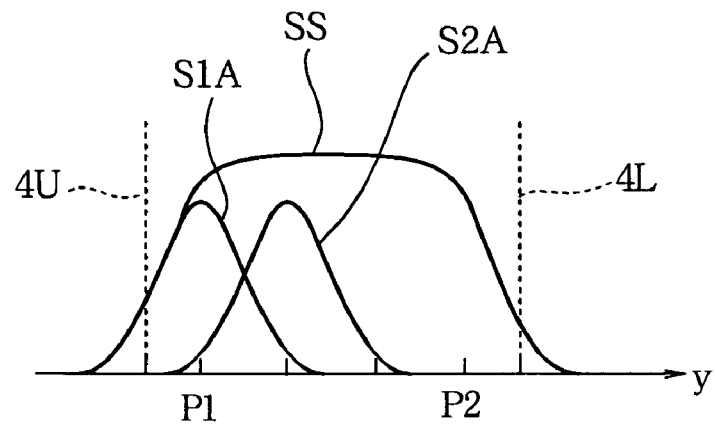
FIGS. 4A-4C illustrate generally distributions of intensity of a screen that human eyes perceive for a period of 16 milliseconds (i.e., 60 Hz)
Figure 4B:
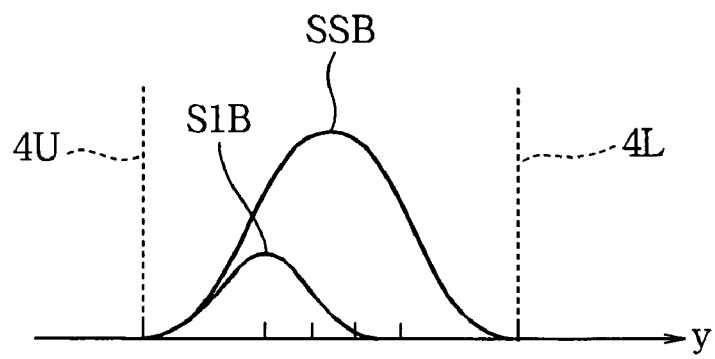
Figure 4C:
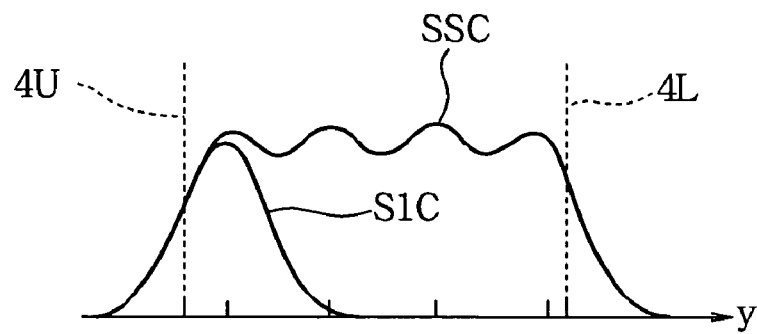

FIGS. 4A-4C illustrate illumination light that scans the light valve 4 and a resultant overall illuminance on the light valve 4.

FIGS. 4A-4C illustrate a distribution of intensity that human eyes perceive for a period of 16 milliseconds (i.e., 60 Hz). In other words, human eyes fail to recognize each moment of light that flashes at a more rapid rate than 60 Hz. By making use of this characteristic of human eyes, the television signal sends 60 images per second to form apparently smoothly moving pictures. That is, human eyes perceive averaged images of 60 discrete images in a predetermined time period (e.g., 16 milliseconds). Thus, it is to be noted that the method and apparatus according to the present invention are not to calculate an average motion of illumination light. FIG. 4A plots the y-ordinate of the screen of the light valve as the abscissa and the surface illuminance on the light valve in an arbitrary unit as the ordinate. A line 4U indicates an upper end and a line 4L represents a lower end of the light valve 4. Curve S1A represents the cross section of illuminance of S1 and Curve S2A represents the cross section of illuminance of S2. Curve SS denotes a resultant illuminance of the entire frame period. Because the center-to-center distance (i.e., scanning interval) between S1A and S2A is equal to the Gaussian radius ro, Curve SS has a flat top and therefore provides a uniform profile of distribution of illuminance across the screen and falls near the lines 4L and 4U. For example, with a back projection type television apparatus, several percent of illuminated area is actually outside of the screen and therefore cannot be viewed. Therefore, when this illumination light having Curve SS is applied to a back projection type television apparatus, portions of Curve SS that fall are outside of the screen, so that the image can be viewed without problems. If a middle portion should have a higher illuminance than other areas, the center-to-center distance between adjacent scanned areas should be shorter so that Curve S1B at four locations are combined at the middle portion in the y direction to produce Curve SSB as shown in FIG. 4B. Curve SSB has a gentle portion in the middle, causing a higher intensity in the middle portion of the screen in the y direction than in the other portion of the screen in the y direction. The illuminance in the left and right direction can be adjusted by modifying scanning speed in the x direction. If the peripheral portion of the screen should be as bright as the middle portion, then the center-to-center distance between adjacent beams of illumination light can be made longer than the Gaussian radius $r_o$ to obtain Curve SSC as a resultant illuminance of the entire frame period. A longer center-to-center distance causes smooth ripples, which present no problems in displaying images as long as the amplitude of the ripples is within several percent of the overall illuminance. Modifying the center-to-center distance between adjacent beams of illumination light in the y direction provides any arbitrary cross section of illuminance from FIG. 4A to FIG. 4C.

As described above, according to the present invention, modification can be made to the profile of distribution of illuminance of the illumination light that illuminates a light valve. Thus, the scanning pattern producing section 17 produces a scanning pattern in accordance with the types of signals to be displayed or the applications of a display apparatus, thereby allowing optimum illumination. Display apparatus for computers preferably have uniform intensity and white level across the entire surface of the screen. In contrast, it is said that a television screen is preferably somewhat brighter in the middle of it than at the peripheral portions of it. In addition, from the point of view of efficiency of light utilization, areas outside of images should not be illuminated. The signal-type detector 12 determines whether an input signal is a computer signal or a television signal. If the input signal is a computer signal, the light valve is scanned with a beam of the illumination light having a uniform profile of distribution of intensity as shown in FIG. 4C. If the input signal is a television signal, the light valve is scanned with the illumination light having a higher profile of distribution of intensity in the middle portion of the screen than in the peripheral portion as shown in FIG. 4A and FIG. 4B. In this manner images can be displayed with appropriate intensity. For television signals, in order for a television signal not to illuminate upper and lower areas or left and right areas outside of the screen area, the scanning sequence, for example, in FIG. 3B may be modified to improve efficiency of light utilization for a brighter screen.

While the first embodiment has been described with respect to a case in which the projector 5 and the screen 6 are provided, the projector 5 and the screen 6 are not essential. An objective optical means (not shown) and an eyepiece may be used in place of the projector to magnify the image.

The intensity on the screen may vary due to various causes. When the light valve 4 is illuminated in a non-telecentric manner, variations of intensity are attributed to (1) the difference in amount of light between the middle of the protector 5 and the periphery of the projector 5, (2) the difference in light transmittance between the middle and periphery of the screen 6 in the form of a Fresnel lens, and (3) the difference in distance between the viewer and the left and right sides of the screen due to the fact that the viewer is not in front of the screen. When variations in intensity occur, modification can be made to the sequence, the number of times, and the speed of a scanning operation in which the scanning mechanism 3 causes the illumination light to scan, thereby correcting the profile of the distribution of illuminance on the light valve 4 to reduce variations of intensity. Further, the intensity of light emitted from the light source 1 may be adjusted in synchronism with the scanning timings of the illumination light. The profile of distribution of illuminance may be adjusted automatically by the use of an instrument, not shown, or manually by selecting the menu, not shown, displayed on a screen. Information on the correction is stored in the scanning pattern producing section 17.

Although the above-described first embodiment has not addressed a method of displaying a color image, the color display may be performed by the use of known methods. For example, (1) the means in FIG. 1 except the screen 6 are provided on a light source-to-light source basis, i.e., for each of three colors (red, green, and blue), and the images formed by the respective means are combined into a full color image; (2) a color filter is used to separate the illumination light emitted from a white-light source into color components, so that the separated color components illuminate the light valve simultaneously; and (3) the light source 1 in FIG. 1 is capable of selectively emitting red, green and blue light and color display is achieved by, for example, displaying the images of the respective colors in sequence.

Second Embodiment

Figure 5:
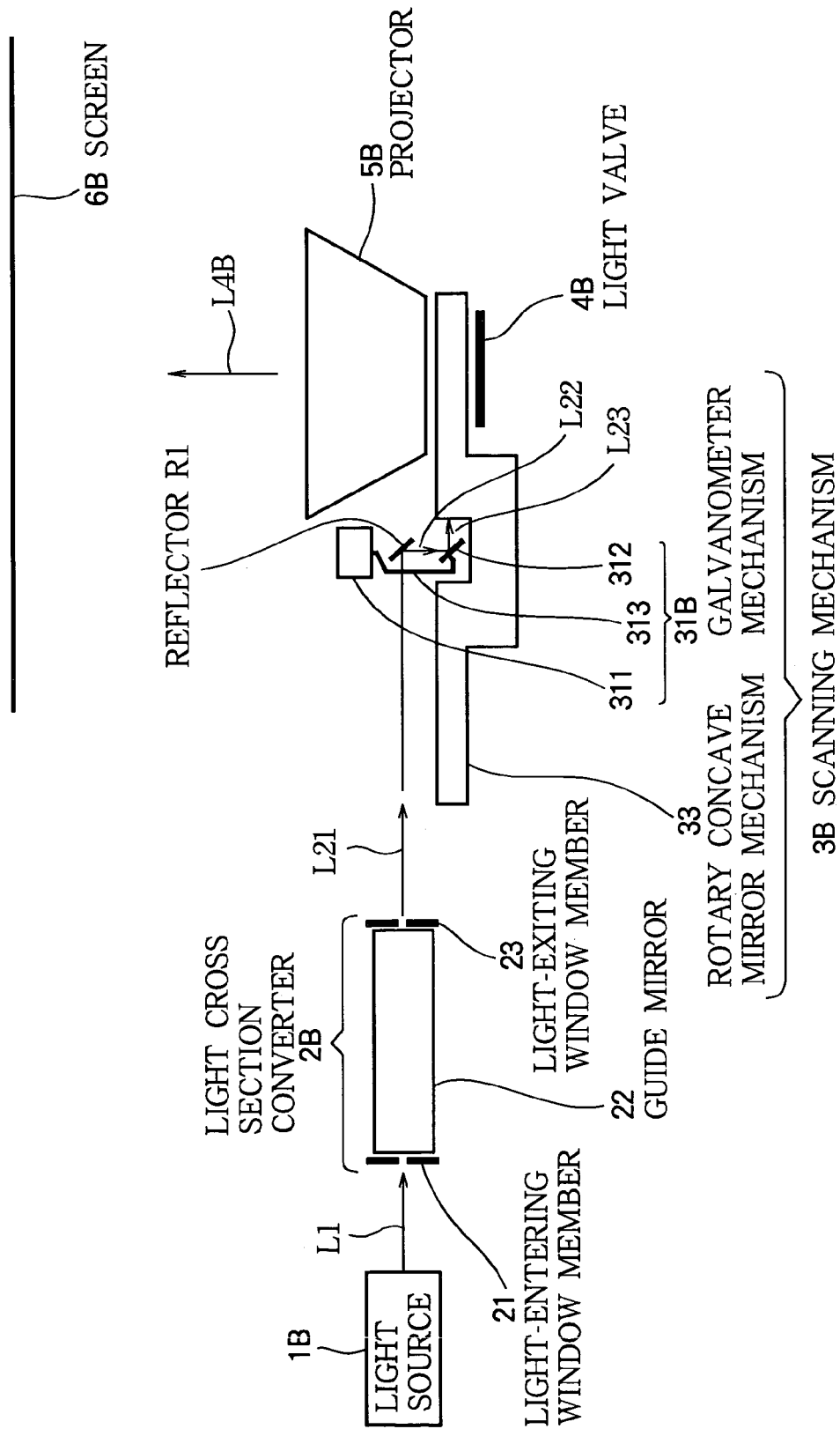
FIG. 5 illustrates a pertinent portion of the configuration of a display apparatus according to a second embodiment.

FIG. 5 illustrates a pertinent portion of the configuration of a display apparatus according to a second embodiment. Referring to FIG. 5, a light source 1B is a semiconductor laser. Light L1 emitted from the light source 1B enters a light cross section converter 2B through a light-entering window member 21. Then, the light L1 transmits through a guide mirror 22 and exits through a light-exiting window member 23. The body of a galvanometer 311 and a mirror 312 are supported on a rotational shaft 313.

The light L21 that has exited the light-exiting window member 23 is incident on a reflector R1 and is reflected by the reflector R1 to become light L22. Then, the light L22 is then reflected by the mirror 312 to become light L23. The reflector R1 causes the light L23 to scan a light valve 4B in the x direction. A rotary concave mirror mechanism 33 reflects the light L23 reflected by a mirror 312 while also rotating on its own axis to cause the light L23 to scan the light valve 4B in the y direction. The light L23 is reflected by the micro mirrors of the light valve 4B and is incident on a wide-angle projector 5B through a transparent medium (e.g. air) of the rotary concave mirror mechanism 33. Then, the light L23 transmits through the projector 5B, exits as light L24, and is finally incident on a screen 6B. The projector 5B is disposed opposite to the light valve 4B with said scanning mechanism positioned between said projector and said light valve 4B.

Figure 6A:
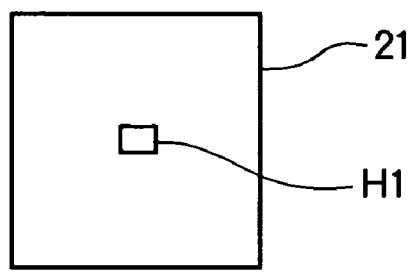
FIG. 6A illustrates a light-entering window member.
Figure 6B:
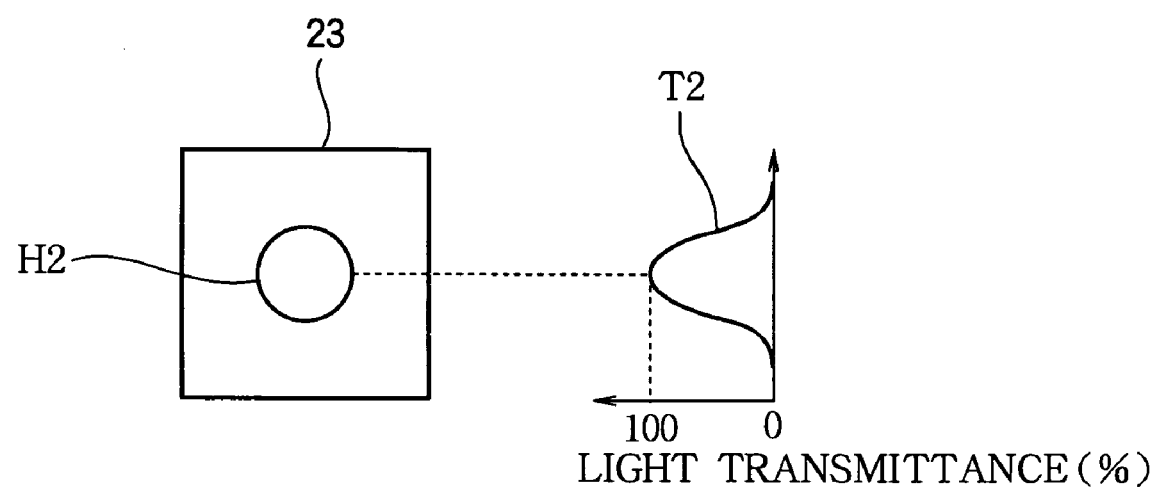
FIG. 6B illustrates the front shape and light transmittance characteristic of the light-exiting window member.

FIG. 6A illustrates the light-entering window member 21. FIG. 6B illustrates the front shape and the light transmittance characteristic of the light-exiting window member 23. Referring to FIG. 6A, the light-entering window member 21 includes a window H1 through which the light emitted from the light source 1B passes and a reflecting surface (mirror) that opposes the guide mirror 22. Referring to FIG. 6B, the light-exiting window member 23 has a circular window H2 through which the light passes and a reflecting surface (mirror) that opposes the guide mirror 22.

Curve T2 in FIG. 6B is a graph illustrating a profile of light transmittance at a cross section of the window H2 that extends in a plane perpendicular to the direction of travel of light. The window H2 takes the form of a half mirror having a light transmittance with a slope like a gentle Gaussian beam, the radius of the window H2 being such that the light transmittance is given by $1/e^2$ of the light transmittance at the central portion. Referring to FIG. 5, the light L1 emitted from the light source 1B enters the light cross section converter 2B through the window H1. The light is reflected many times in the light cross section converter 2B and exits through the window H2. Thus, the light-entering window member 21 and light-exiting window member 23 have a highly reflective surface such that repetitive reflection does not cause a significant loss of light. For this purpose, the light-entering window member 21 and light-exiting window member 23 have flat reflective surfaces that are accurately parallel to each other or at least one of the reflective surfaces is concave. The guide mirror 22 takes the form of a hollow member having a mirror-like inner surface or of a highly transmissive glass column. The light is reflected many times within the guide mirror 22 in such a way that the guide mirror 22 reflects the light toward the optical axis of the guide mirror 22. The guide mirror 22 is not an essential element that constitutes the light cross section converter 2B and can be omitted if only a small portion of the light travels to diverge away from the optical axis. The larger the window H1 than the window H2 and the smaller the number of times of reflection by the inner surfaces of the light cross section converter 2B, the larger portion of the incident light can be converted into the exiting light. If a large portion of the incident light directly exits through the window H1, the cross section of the beam of illumination light is not converted properly to have a shape of a Gaussian beam. Thus, if a large portion of the incident light exits directly through the window H2, the maximum value of T in FIG. 6B can be set to a value smaller than 100%.

Figure 7A:
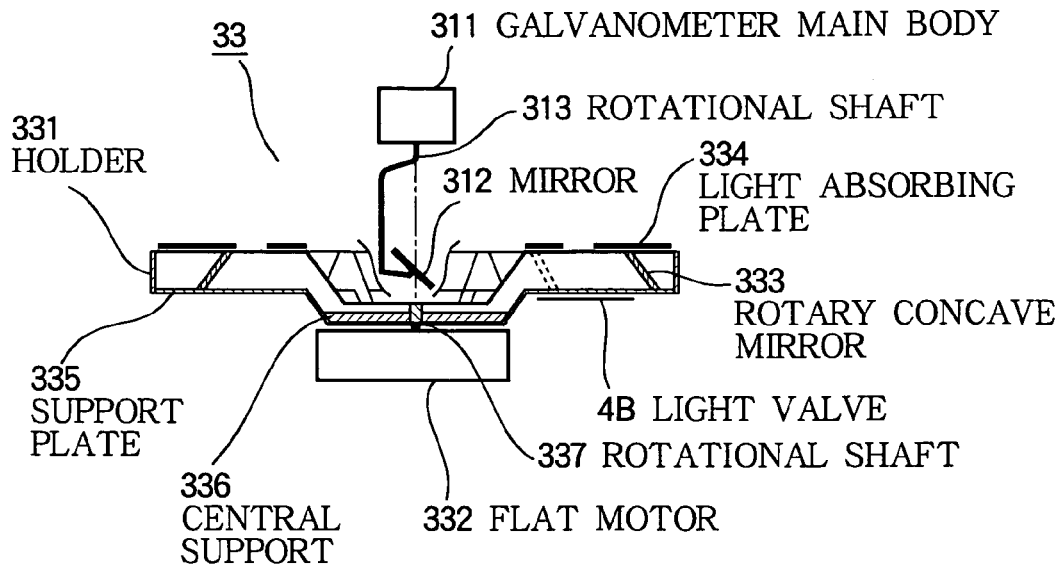
FIGS. 7A and 7B are a side view and a top view, respectively, illustrating the configuration of the scanning mechanism for a display according to the second embodiment.
Figure 7B:
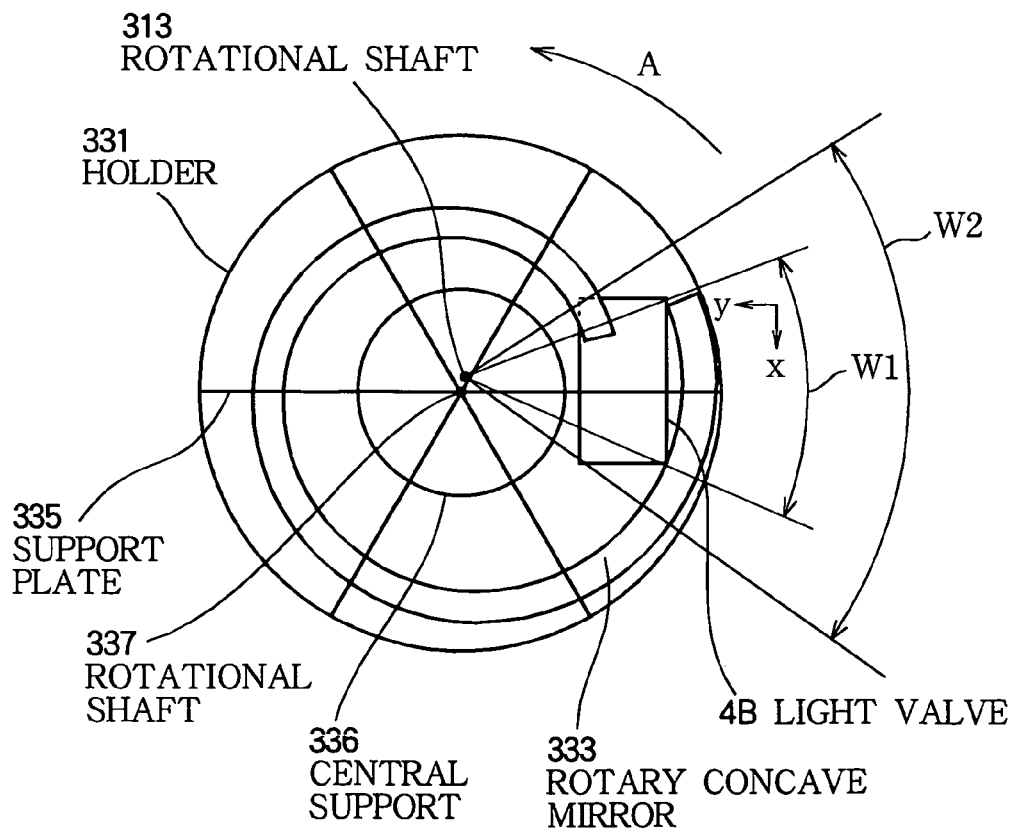

FIGS. 7A and 7B are a side view and a top view, respectively, illustrating the configuration of the scanning mechanism 3B for a display apparatus according to the second embodiment. Referring to FIG. 7A, the rotary concave mirror mechanism 33 includes a rotary concave mirror 333, a holder 331 that holds the rotary concave mirror 333, a flat motor 332, a light absorbing plate 334 as a scanning aperture, a support plate 335 of the rotary concave mirror 333, a central support 336, and a rotational shaft 337 about which the rotary concave mirror mechanism 33 rotates.

FIG. 7B illustrates the rotary concave mirror 33 with the light absorbing plate 334 omitted. Angles W1 and W2 represent angular ranges through which a galvanometer mechanism 31B causes the illumination light to scan in the x direction. The W1 is an angular range when the illumination light scans an upper end of the light valve 4B and the W2 is an angular range when the illumination light scans a lower end of the light valve 4B. The rotary concave mirror 333 is preferably made of a lightweight, strong material such as metal, plastics, glass or a combination of these materials, formed into a desired shape. The surface of the rotary concave mirror 333 is made highly reflective by a known method such as vapor deposition.

The light absorbing plate 334 is, for example, a metal plate painted black and has an aperture that is similar in shape to and somewhat smaller than the rotary concave mirror 333 in FIG. 7B as seen from above. The light absorbing plate 334 is fixed to the support plate 335. The support 331, rotary concave mirror 333, support plate 335, and holder 336 may be molded in integral form. This improves the manufacturing efficiency.

Referring to FIG. 7B, one of two long sides of the light valve 4B is closer to the rotational shaft 337 than the other of the two long sides. The long side closer to the rotational shaft 337 corresponds to the lower end 4L of the light valve 4B and the long side further away from the rotational shaft 337 corresponds to the upper end 4U. The reflecting surface of the rotary concave mirror 333 extends all across the light valve 4B in the x direction. The rotary concave mirror 333 spirals. Therefore, as the support 336 rotates about the rotational shaft 337 counterclockwise (arrow A), the reflecting point on the aforementioned reflective surface moves in the y direction, so that the illumination light scans across the light valve 4B. Meanwhile, the galvanometer mechanism 31B causes the illumination light to scan across the light valve 4B in the x direction and from the upper end 4U to the lower end 4L in the y direction. When the reflecting point of the rotary concave mirror 33 is at the upper end 4U of the light valve 4B, the galvanometer mechanism 31B causes the illumination light to scan the light valve 4B in the x direction through the angle range W1. The angle through which the illumination light scans the light valve 4B is not a fixed value but gradually increases from W1 to W2. In this manner, the illumination light scans across the entire area of the light valve 4B. The light reflected by the rotary concave mirror 333 is incident on the light valve 4B. The micro mirror elements of the light valve 4B are driven to incline on a pixel-by-pixel basis, so that ON-light is reflected in a first direction (ON-light passes through the aperture in the light absorbing plate 334) and OFF-light is reflected in a second direction. When the holder 336 rotates about the rotational shaft 337 counterclockwise (arrow A), the light absorbing plate 334 also rotates, so that the opening (scan aperture) of the light absorbing plate 334 gradually moves (i.e., scans) relative to the light valve 4B in the y direction. As described above, the light absorbing plate 334 has a small, narrow opening that scans the light valve 4B in the y direction, thereby reducing stray light that would otherwise enter the projector.

Figure 8:
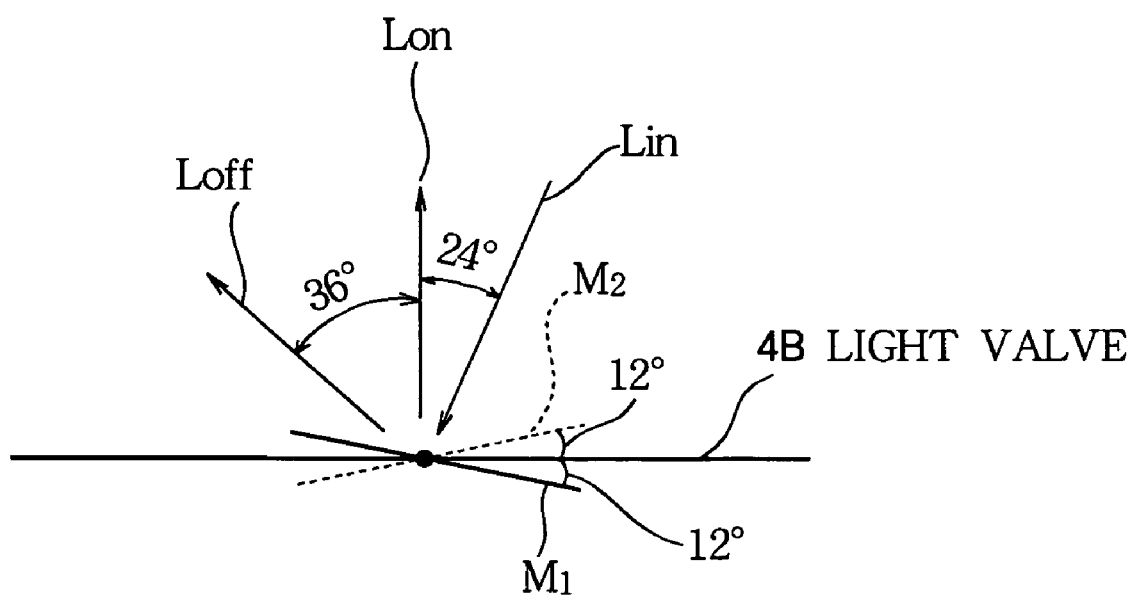
FIG. 8 illustrates the directions of travel of the light incident on the mirror of the light valve and light reflected by a micro mirror.

FIG. 8 illustrates the directions of travel of the light incident on a micro mirror element of the light valve 4B and light reflected by the micro mirror element. It is assumed that the line normal to the surface of the light valve 4B is a reference and angles counterclockwise relative to the reference are positive ("+") and angles clockwise are negative ("−") For example, M1 is −12° and M2 is +12° relative to the light valve 4B. When the illumination light is incident on the micro mirror element in a direction Lin, if the micro mirror element is at angle M1, the light is reflected in a direction Lon (normal to the light valve 4B) to become ON-light; and if the micro mirror is at an angle M2, the light is reflected in a direction Loff (+36° relative to Lon) to become OFF-light. The ON-light passes near the rotary concave mirror 333 to the projector 5B while the OFF-light is absorbed by the light absorbing plate 334. The above-described angles M1 and M2 are only exemplary and the inclination of the micro mirror element may be other angles.

Figure 9:
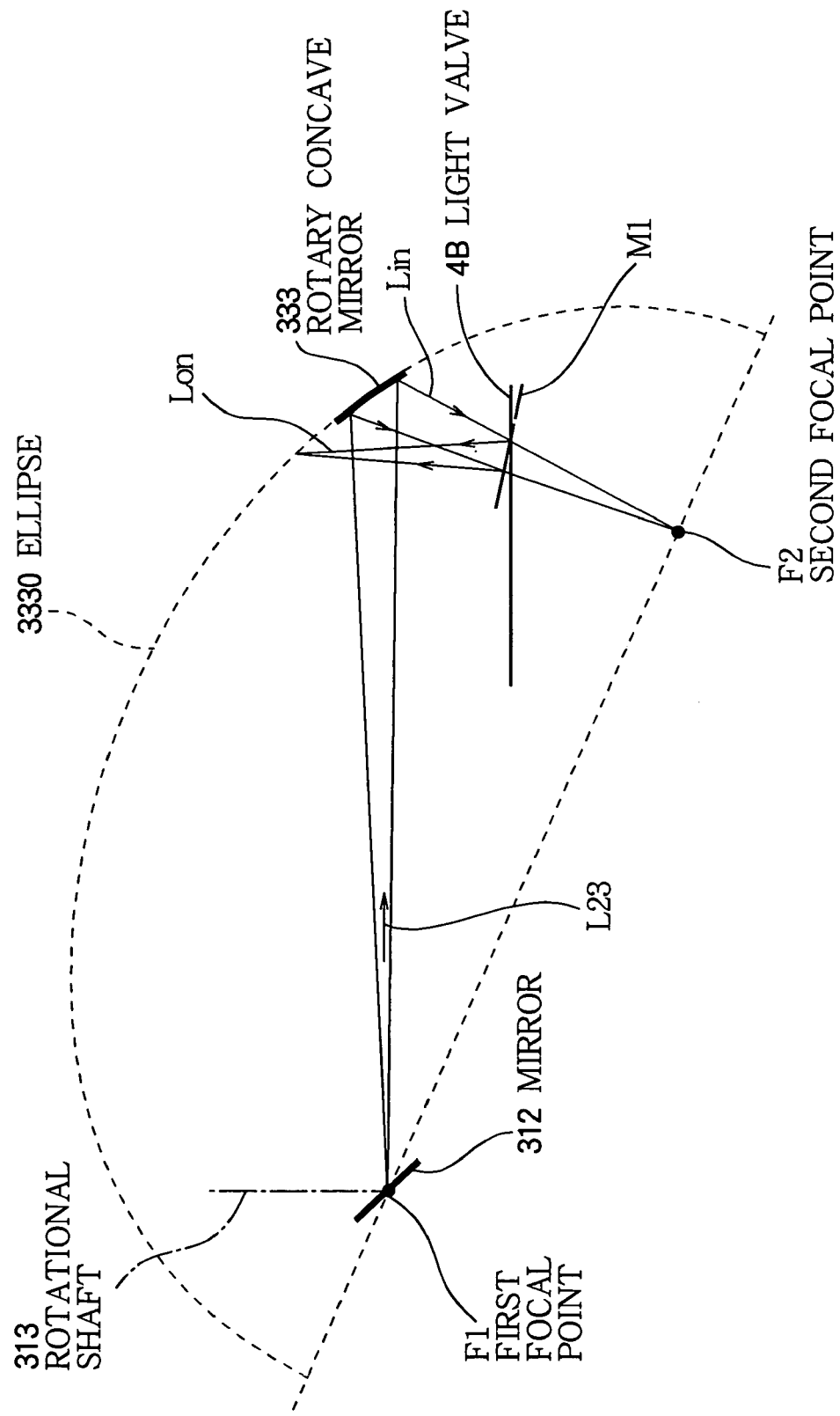
FIG. 9 is a diagrammatic representation of a method for illuminating the light valve.
Figure 10A:
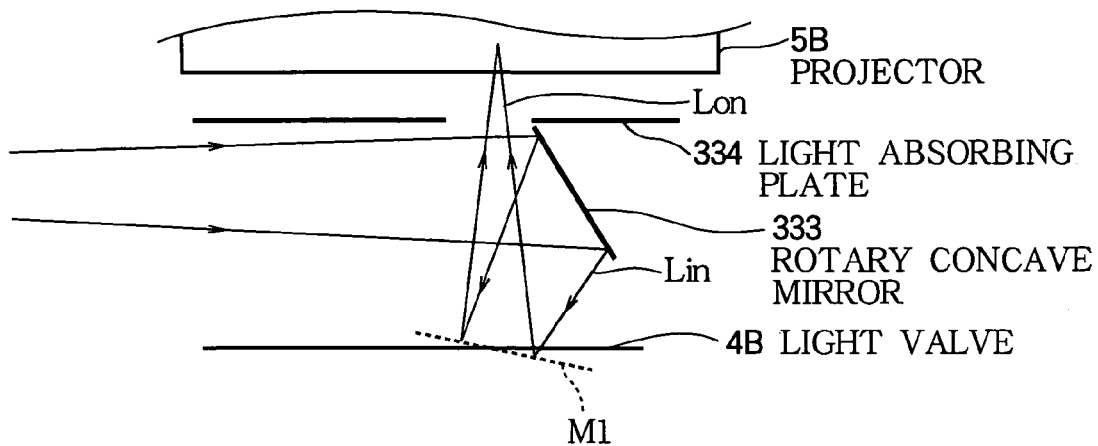
FIGS. 10A-10C are enlarged views of a rotary concave mirror mechanism for the display according to the second embodiment.
Figure 10B:
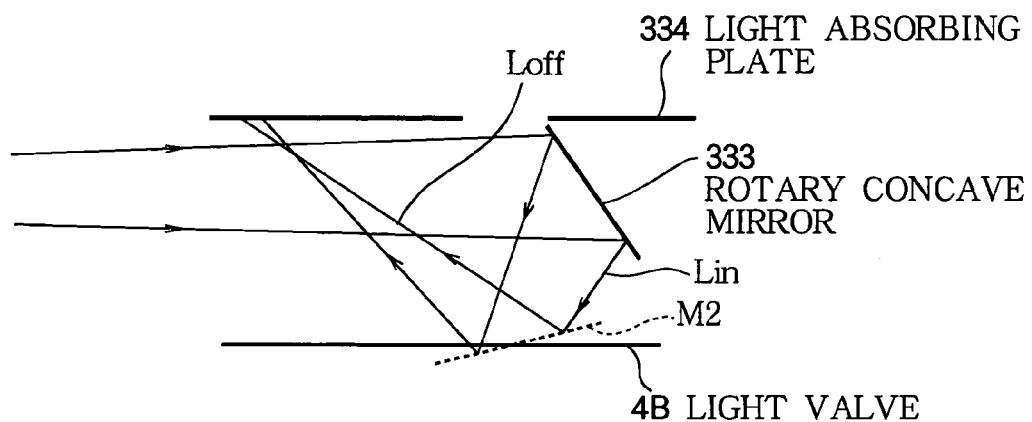
Figure 10C:
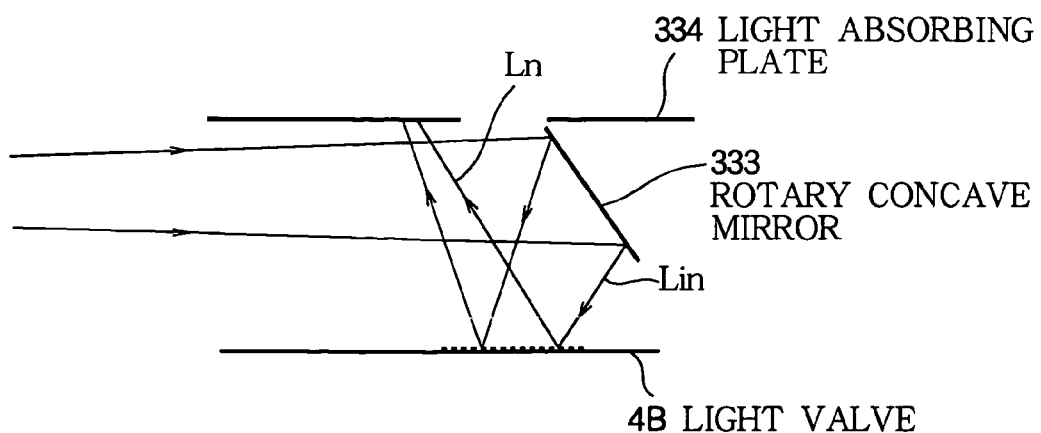

FIG. 9 is a diagrammatic representation of a method for illuminating the light valve 4B. The mirror 312 of the galvanometer mechanism 31B is used for scanning the light valve 4B in the x direction, and is disposed at a first focal point F1 of an ellipse 3330 in which a reflecting surface of the rotary concave mirror 333 lies. Light L23 reflected by the mirror 312 is again reflected by an elliptic surface (i.e., quadratic curve) of the rotary concave mirror 333 to become light in a direction Lin. The illumination light in the direction Lin travels toward a second focal point F2 of the ellipse 3330, and then impinges on the light valve 4B. For example, when the micro mirror element is at the angle M1, the illumination light is reflected by the light valve 4B to become light in a direction Lon. FIGS. 10A-10C are enlarged views of the rotary concave mirror mechanism 33 for a display apparatus according to the second embodiment, and illustrate the directions of the illumination light incident on and reflected by the light valve 4B when the entire light valve 4B is in the ON state, OFF state, and an intermediate state, respectively. Specularly reflected light from non-pixel areas of the light valve 4B and a cover glass (not shown) travels in the direction Ln. As shown in FIG. 10A, when the micro mirror element of the light valve 4B is at the angle M1, ON-light passes beside the rotary concave mirror 333 in the direction Lon and through the opening 334a (transparent medium, e.g., air) of the light absorbing plate 334 to the projector 5B. As shown in FIG. 10B, when the micro mirror element is at the angle M2, OFF-light travels in the direction Loff to be absorbed by the light absorbing plate 334. As shown in FIG. 10C, the specularly reflected light traveling in the direction Ln is also absorbed into the light absorbing plate 334. When the rotary concave mirror 333 rotates, the reflecting point of the rotary concave mirror 33 displaces leftward in FIG. 10A to reach the left end of the light valve 4B. Subsequently, the reflecting point quickly moves to the rightward to reach the right end of the light valve 4B. In this manner, the rotary concave mirror 333 causes the illumination light in the direction Lin to scan the light valve 4B in the y direction while also allowing the ON-light to travel in the direction Lon toward the projector 5B, so that the OFF-light and the unwanted specular reflection in a direction Ln are removed. Because the OFF-light is absorbed, a noise-free apparatus can be implemented.

Figure 11:
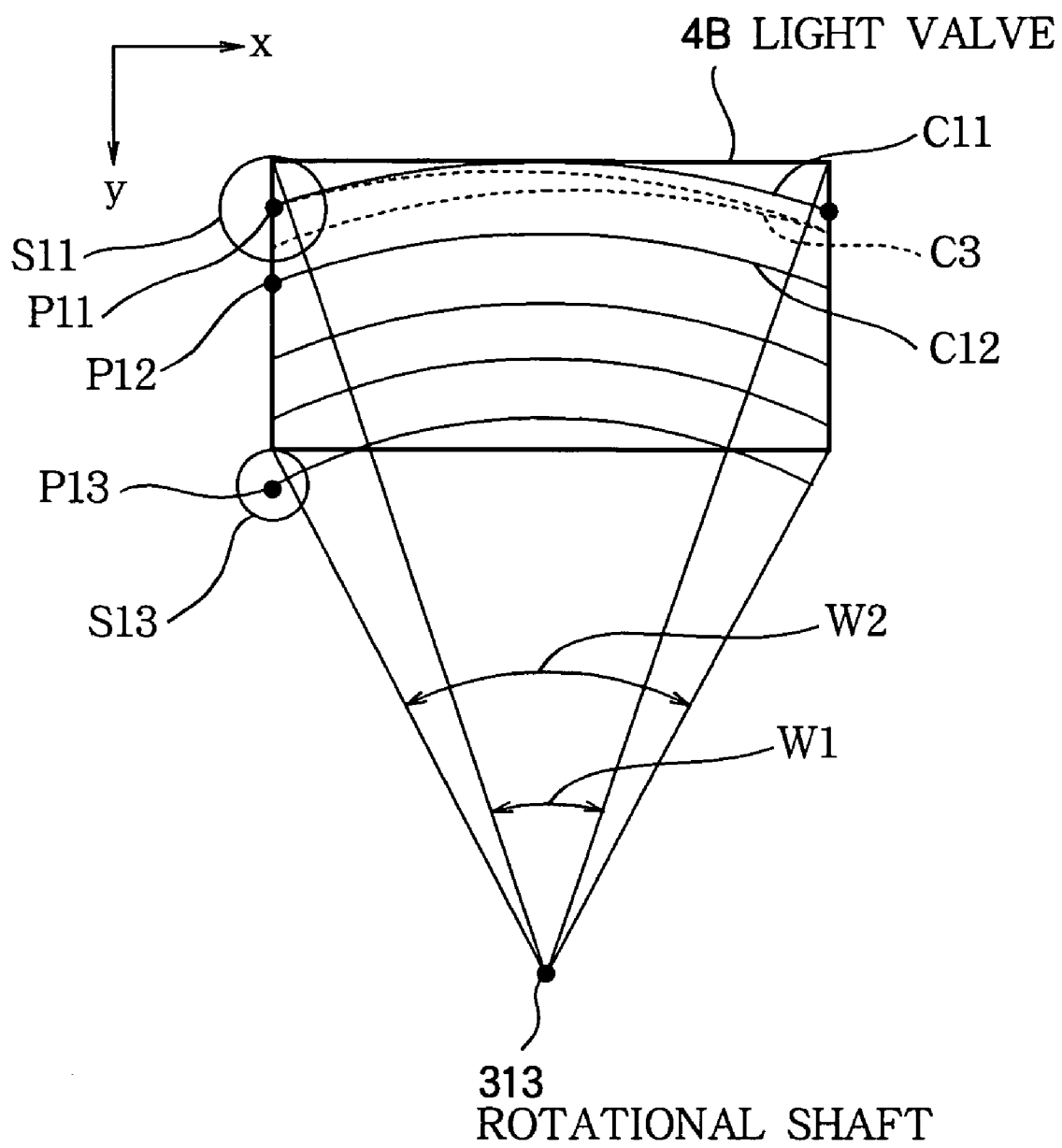
FIG. 11 shows the display according to the second embodiment illustrating the sequence in which the light valve is illuminated during one frame.

FIG. 11 shows the display apparatus according to the second embodiment illustrating the sequence in which the light valve 4B is illuminated during one frame. The illumination begins at a point P11 with an illuminated area S11. The illumination light takes up a position P12 about 4 ms after P11, and a position P13 about 16 ms after P11. Reference numeral S13 denotes an illuminated area 16 ms after P11. Concentric arcs C11 and C12 denote the loci of the center of the illumination light starting from P11 and P12, respectively, when the illumination light scans across the light valve 4B in the x direction. Because the illumination light illuminates a small circular area such as S11, the illumination light cannot illuminate across the entire length of C11 at a time. Thus, the rotary concave mirror 333 rotates so that the substantially circular illuminated area moves in the y direction. Meanwhile, the galvanometer mechanism 31B causes the illumination light to scan across the light valve 4B from left to right in the x direction, making one complete return trip in the x direction during a period of, for example, 2 ms. Reference numeral C3 denotes the locus of one complete return trip of the illumination light in the x direction. The speed of scanning and the number of times of scanning are selected such that the outer peripheries of the illuminated adjacent areas (i.e., the skirt portion of the Gaussian beam) overlaps one another to implement a smooth, uniform profile of distribution of illuminance. The thus selected speed of scanning and the number times of scanning are stored previously in the scanning pattern producing section 17. When the illumination light reaches the position P13 at the end of the frame, the light source 1B is turned off. The illumination light quickly moves back to the point P11 at which the next scanning cycle begins for the next frame. Then, the light source 1B is turned on again.

Referring back to FIG. 7B, the support plate 335 extends from the rotational shaft 337 in six radial directions. The number of the support plates 335 are not limited to 6 and may be any number provided that the support plate 335 makes a structure strong enough to hold the rotary concave mirror 333 rigidly. When the support plate 335 and rotary concave mirror 333 rotates together, they create a flow of air near the light valve 4B. The flow of air is effective in preventing temperature from increasing due to absorption of illumination light and heat generated by the structural elements during the operation. Because the light absorbing plate 334 rotates together with the rotary concave mirror 333, the heat due to absorbed OFF-light is transferred to the surrounding air, so that unwanted heat is not transferred to the light valve 4B and the projector 5B. The central support 336 is formed of a somewhat thick metal material so as to firmly hold the middle portion of the support plate 335 and is fixed to the rotational shaft 337. The rotational balance of the rotary concave mirror 333 may be achieved with respect to the rotational shaft 337 by cutting off part of the support plate 335, holder 331, or central support 336. Achieving rotational balance of the rotary concave mirror 333 eliminates abnormal sounds and blurred images due to vibration of the apparatus.

Figure 12A:
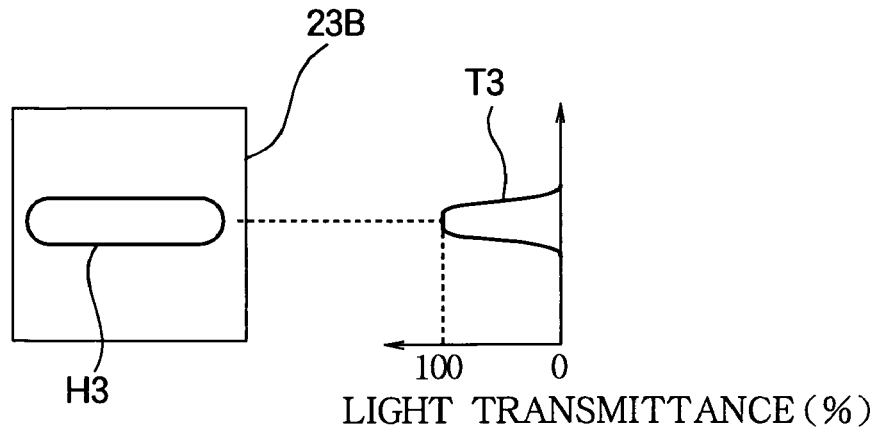
FIG. 12A illustrates a light exiting window member for the light cross section converter that emits illumination light having other cross section.
Figure 12B:
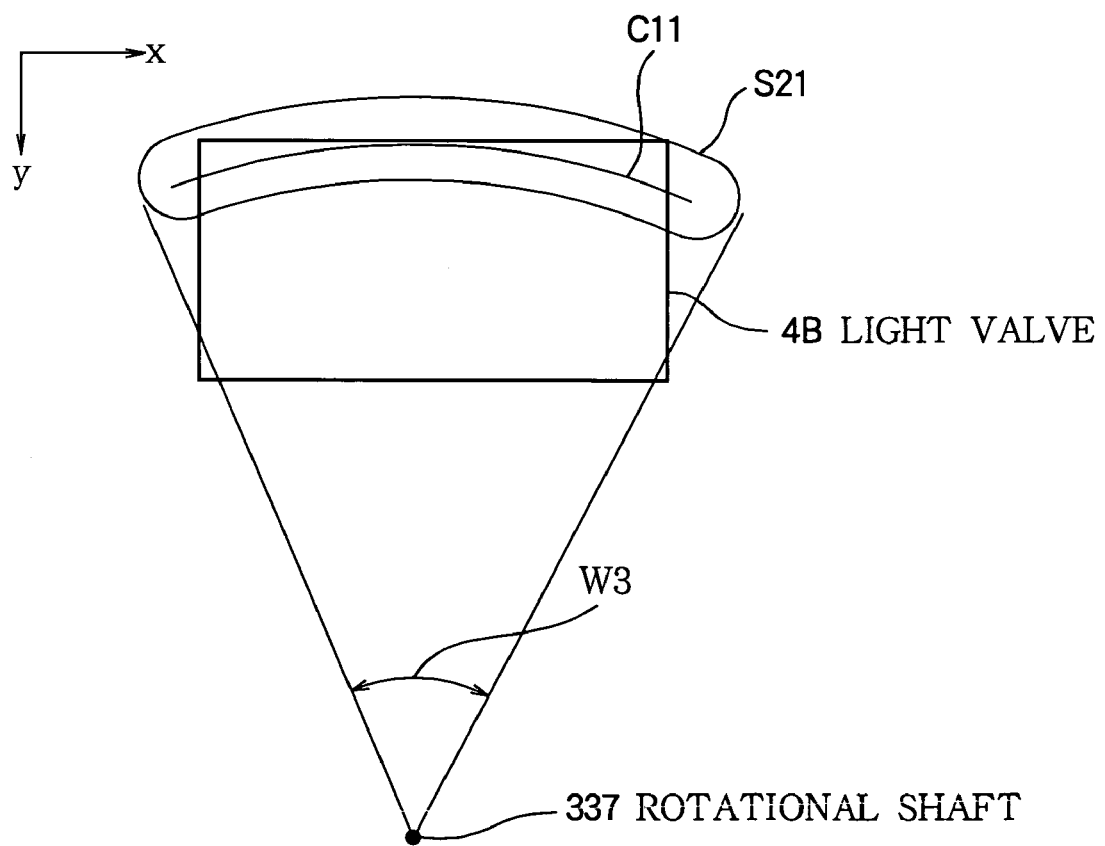
FIG. 12B illustrates the shape of an illuminated area on the light valve.

The cross section of the window H2 of the light cross section converter 2B in FIG. 6B is selected such that the light L21 exiting the light cross section converter 2B is a Gaussian beam having a circular cross section. However, the cross section of the light L21 may be other shape. FIG. 12A illustrates a light-exiting window member 23B for the light cross section converter 2B that emits illumination light of other cross section. FIG. 12B illustrates the shape of an illuminated area on the light valve. Reference numeral H3 and T3 denote an elongated window, and a light transmittance of the window H3, respectively. Reference numeral S21 and W3 denote the shape of an illuminated area and an angular range, respectively, in which the illumination light L23 scans the light valve 4B in the x direction. When one frame of an image is displayed, the illumination light begins to illuminate the top portion of the light valve 4B as denoted at S21. Then, the illuminated area S21 gradually moves on the light valve 4B from top to bottom, thereby illuminating the entire surface of the light valve 4B. If the angular range W3 can be made large enough to cover across the light valve 4B, then the galvanometer mechanism 31B (scanning means in the x direction) may be omitted, thereby simplifying the scanning mechanism 3B. The size of the illuminated area S21 may vary depending on the position in the y direction, in which case a smaller illuminated area tends to have a lower illuminance. If a more uniform illuminance is required, the intensity of light emitted from the light source 1B may be corrected inversely with the changes in the illuminated area S21 or the pitch of the spiral of the rotary concave mirror 333 may be changed to correct the speed at which the illumination light scans the light valve 4B in the y direction.

While the light source 1B according to the second embodiment has been described with respect to a semiconductor laser, the light source can be any type such as electrodeless discharge lamp, an array-type laser diode, and ultra high pressure mercury lamp provided that the illumination light can be converged into a size smaller than the light valve 4B. When the light source 1B takes other forms than a semiconductor laser, the shape of the window H1 of the light cross section converter 2B is modified in accordance with the property of light emitted by the light source so that the illumination light can pass efficiently. If the light emitted from the light source has a profile of a Gaussian beam, the light cross section converter 2B may be omitted, thereby simplifying the apparatus. A laser light source emits light in a single transverse mode and therefore the intensity of the output light has a profile of distribution in the shape of a Gaussian beam across the cross section.

Lasers have a stable phase. Thus, if a laser light source is employed in displaying an image, human eyes perceive speckles due to the fact that light coming from a plurality of paths interfere with one another. The rotary concave mirror of the invention rotates to cause the illumination light to scan the light valve 4B. This type of scanning creates differences in light path, causing the phase of the projected light to be disturbed before the projected light enters viewer's eyes, due to very small-amplitude vibration of the apparatus resulting from the rotation of the rotary concave mirror. Thus, speckles may be reduced inherently as compared to the conventional display apparatus. A light scanning mechanism with a reduced thickness according to the present invention replaces the conventional glass prisms, thereby implementing a miniaturized display apparatus. For a projection type display apparatus, the distance between the light valve and the projector can be shortened, thereby implementing a shorter back focal length of the projector. This facilitates design of a projector having a shorter projection distance, providing a compact display apparatus.

Third Embodiment

Figure 13:
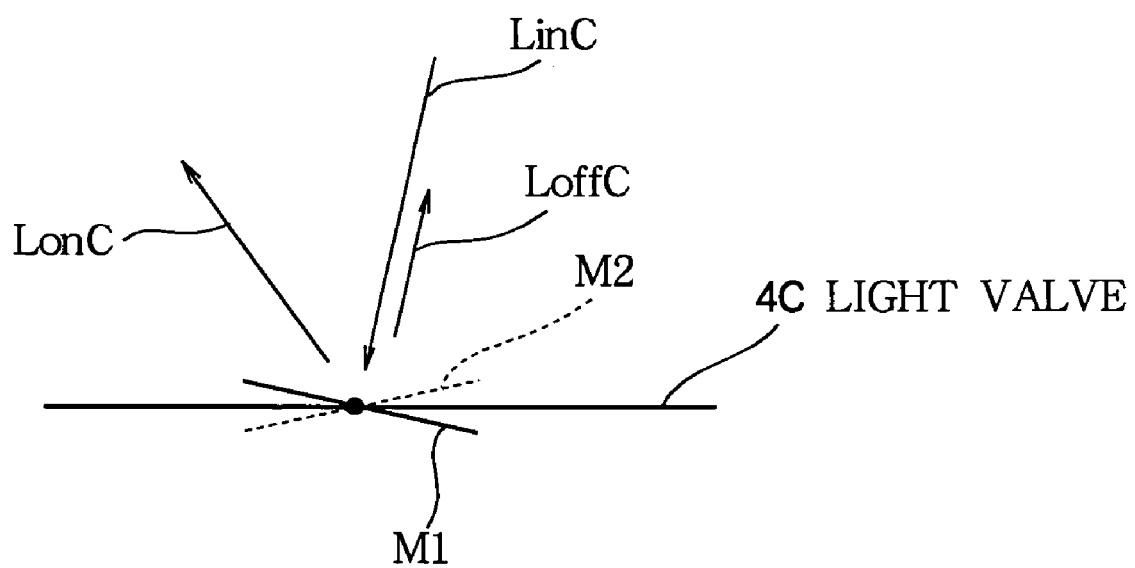
FIG. 13 shows a third embodiment illustrating directions of light incident on a micro mirror element of a light valve and light exiting the micro mirror element.

A third embodiment has substantially the same configuration as the second embodiment in FIG. 5. The third embodiment will be described with respect to structural elements different from those in the second embodiment. FIG. 13 shows the third embodiment illustrating directions of light incident on a micro mirror element of a light valve 4C and light exiting the micro mirror element. When the micro mirror element is at an angle M1, (i.e., −12° with respect to the surface of the light valve 4B), the illumination light is incident on the micro mirror element in a direction LinC, normal to the surface of the micro mirror. For example, when the micro mirror element is at the angle M1, the illumination light incident in a direction LinC is reflected straight back in a direction LoffC. The thus reflected light does not contribute to image formation. When the micro mirror element is at an angle M2, the illumination light incident in the direction LinC on the micro mirror element incident is reflected in a direction LonC. This reflected light in the LonC contributes to image formation.

Figure 14:
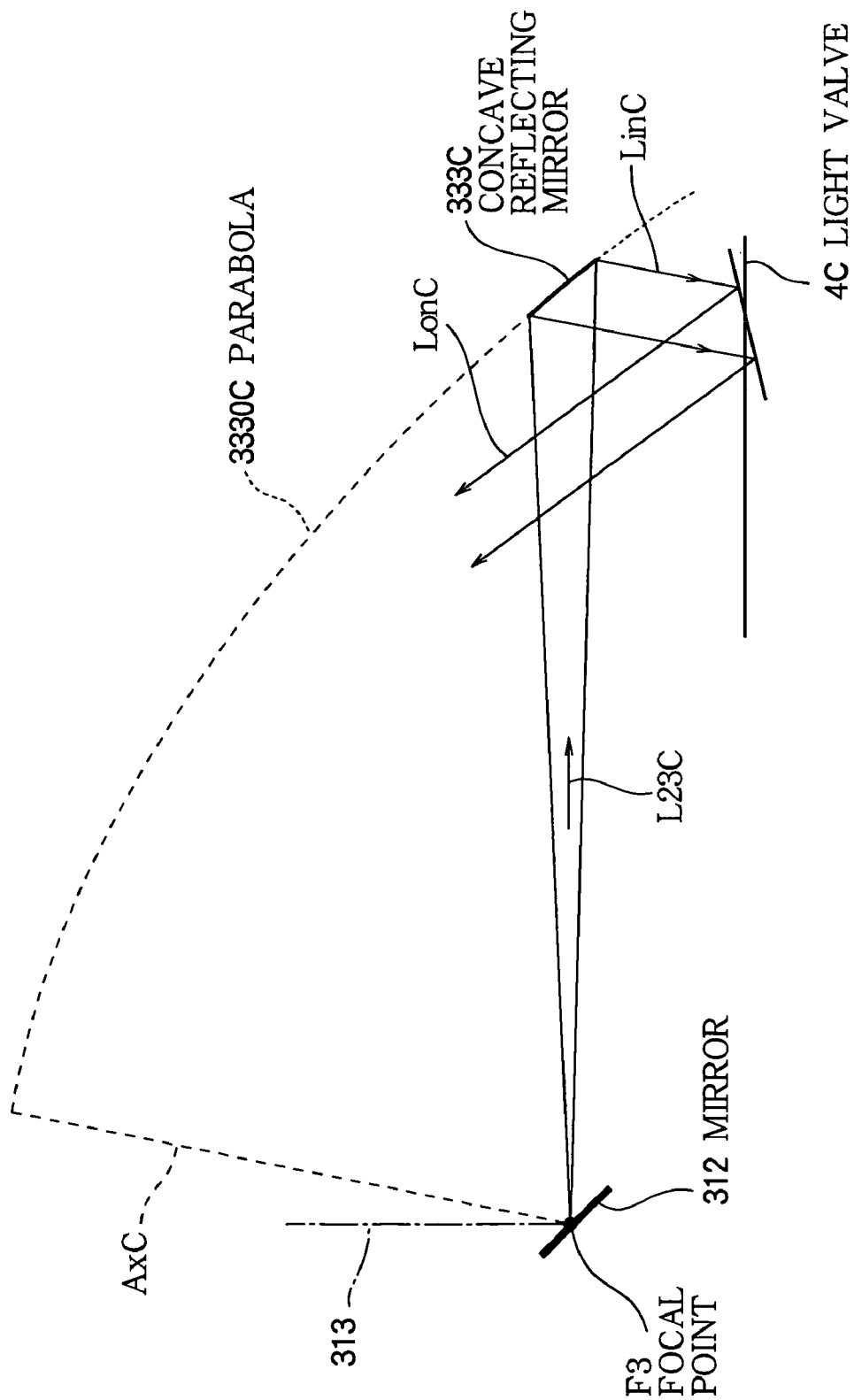
FIG. 14 is a diagrammatic representation illustrating, with the aid of the light paths, a method for illuminating the light valve according to the third embodiment.
Figure 15:
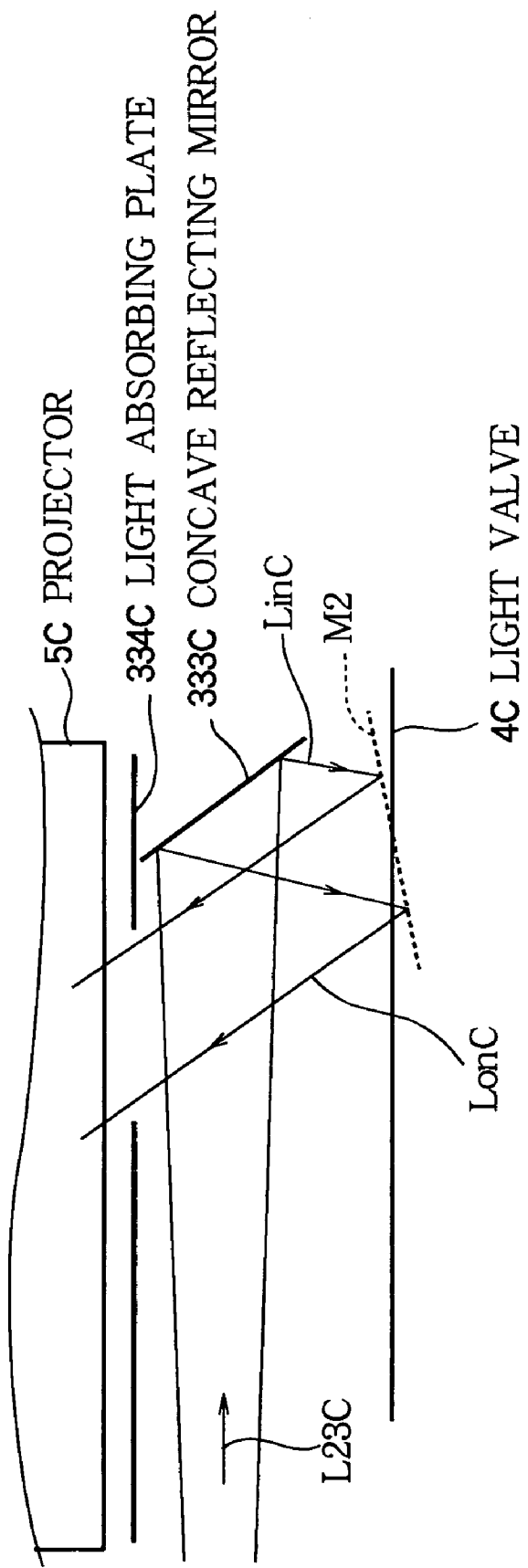
FIG. 15 illustrates a direction LonC in which the ON-light emits from the light valve 4C.

FIG. 14 is a diagrammatic representation illustrating, with the aid of the light paths, a method for illuminating the light valve 4C according to the third embodiment. Reference numerals 333C and 3330C denote a concave reflecting mirror and a parabola (i.e., quadratic curve) in which the concave reflecting mirror 333C lies, respectively. Reference numerals F3 and AxC denote a focal point of the parabola 3330C and an axis of the parabola 3330C, respectively. Light L23C reflected by the reflecting mirror 312 at the focal point F3 is reflected by the concave reflecting mirror 333C to become light in the direction LinC, which is parallel to the axis AxC, and illuminates the light valve 4C. FIG. 15 illustrates a direction LonC in which the ON-light exits the light valve 4C. Referring to FIG. 15, reference numeral 334C and 5C denote a light absorbing plate as a scanning aperture and a projector, respectively. The projector 5C is disposed opposite to the light valve 4C with said scanning mechanism positioned between said projector and said light valve 4C. Assuming that the micro mirror element is at the angle M2 (e.g., +12° counterclockwise from the direction normal to the light valve 4C), the direction LonC is at +36°. The ON-light in the direction LonC emitted from the light valve 4C is incident on the projector 5C through a transparent medium such as air. The projector 5C receives the ON-light traveling in the direction LonC and projects the ON-light onto a screen. The direction LonC can be modified by adjusting the inclination of the micro mirror element that emits the ON-light. For example, the direction LonC may be oriented parallel to the optical axis of the projector 5C or in a direction such that the desirable optical properties of the screen are obtained.

The OFF-light in the direction LoffC passes through the concave reflecting mirror 333C, mirror 312, and reflector R1 to reach a light-exiting window member 23 of the light cross section converter 2B. The OFF-light in the direction LoffC travels through the window H2 of the light-exiting window member 23 into the light cross section converter 2B. Then, the OFF-light in the direction LoffC is reflected back many times between the light-entering window member 21 and the light-exiting window member 23 so that part of the light exits through the window H2 and becomes light L23, which in turn illuminates the light valve 4C. Part of the OFF-light that travels in the direction LoffC and fails to transmit into the light cross section converter 2B is absorbed into a light absorbing member (not shown), and prevented from becoming stray light. Because the OFF-light is collected, an apparatus having a high luminance can be implemented.

Fourth Embodiment

Figure 16:
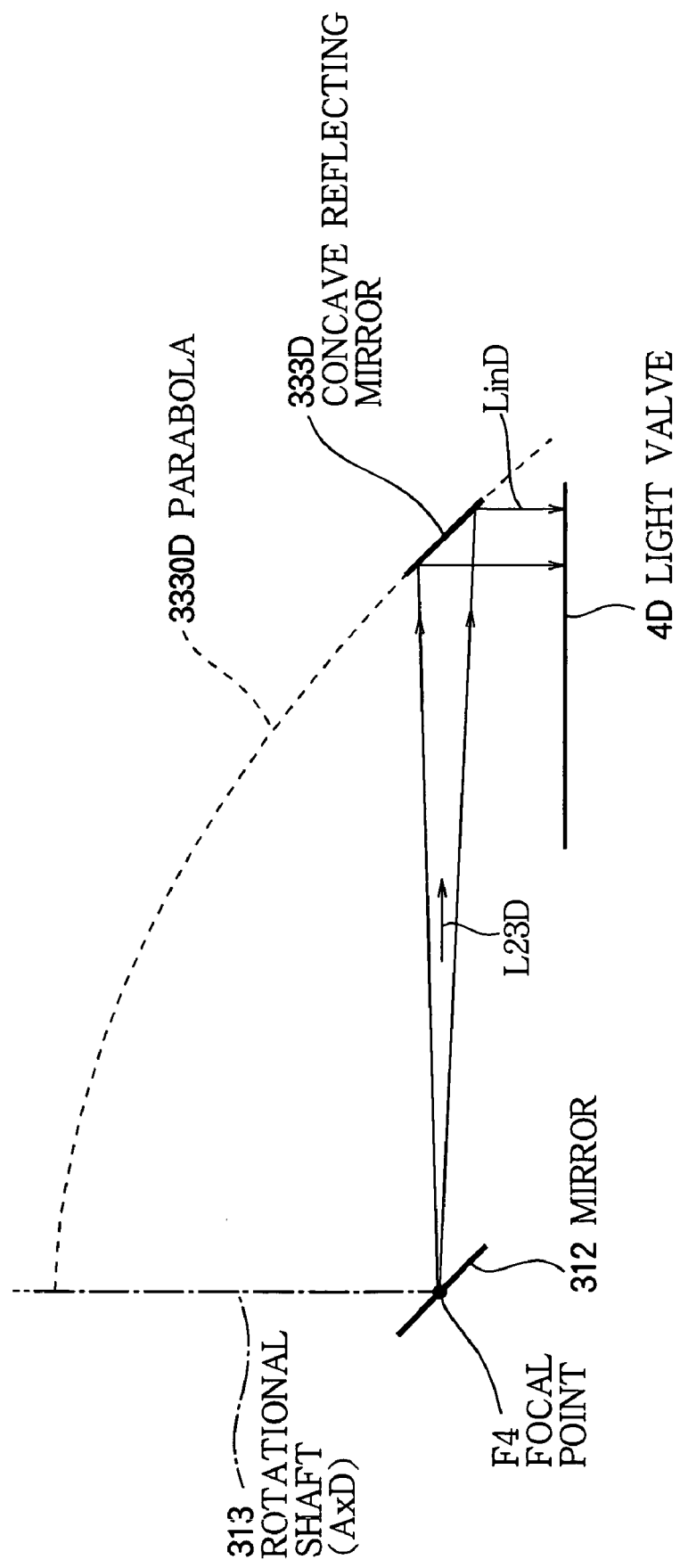
FIG. 16 is a diagrammatic representation illustrating, with the aid of light paths, a method for illuminating the light valve according to a fourth embodiment.

A fourth embodiment has substantially the same configuration as the second embodiment in FIG. 5. The fourth embodiment will be described in terms of structures different form those of the second embodiment. FIG. 16 is a diagrammatic representation illustrating, with the aid of light paths, a method for illuminating a light valve 4D according to the fourth embodiment. Reference numerals 4D and 333D denote a reflective type light valve and a concave reflecting mirror that serves as a reflection type polarization separating means, respectively. Reference numerals F4 and AxD denote a focal point of a parabola 3330D and the axis of the parabola 3330D in line with the rotational shaft 313. The light L23D reflected by a mirror 312 at the focal point F4 reaches the concave mirror 323D. The illumination light L23D is then reflected by the concave mirror 333D to become light incident on light valve 4D in a direction LinD parallel to the axis AxD. The concave reflecting mirror 333D as a reflection type polarization separating means is configured by a known means. If the concave reflecting mirror 333D is formed of a film-like material, the peripheral potion of the concave reflecting mirror 333D is supported by a holding frame (not shown) and divided into a plurality of segments as required, thereby maintaining a spiral curved surface. The light valve 4D reflects the illumination light of a single polarization direction traveling in the direction LinD such that the reflected light has a polarization direction rotated on a pixel-by-pixel basis. The light reflected by the light valve 4D passes through the concave reflecting mirror 333D that serves as a polarization separating means. The changes in polarization direction of the light are converted into the change in the intensity of light, thereby forming an image as a whole. In other words, the polarization direction of the ON-light in the direction LonD incident on the concave reflecting mirror 333D varies from pixel to pixel such that the ON-light in the direction LonD has different intensities from pixel to pixel after having passed through the concave reflecting mirror 333D.

Figure 17:
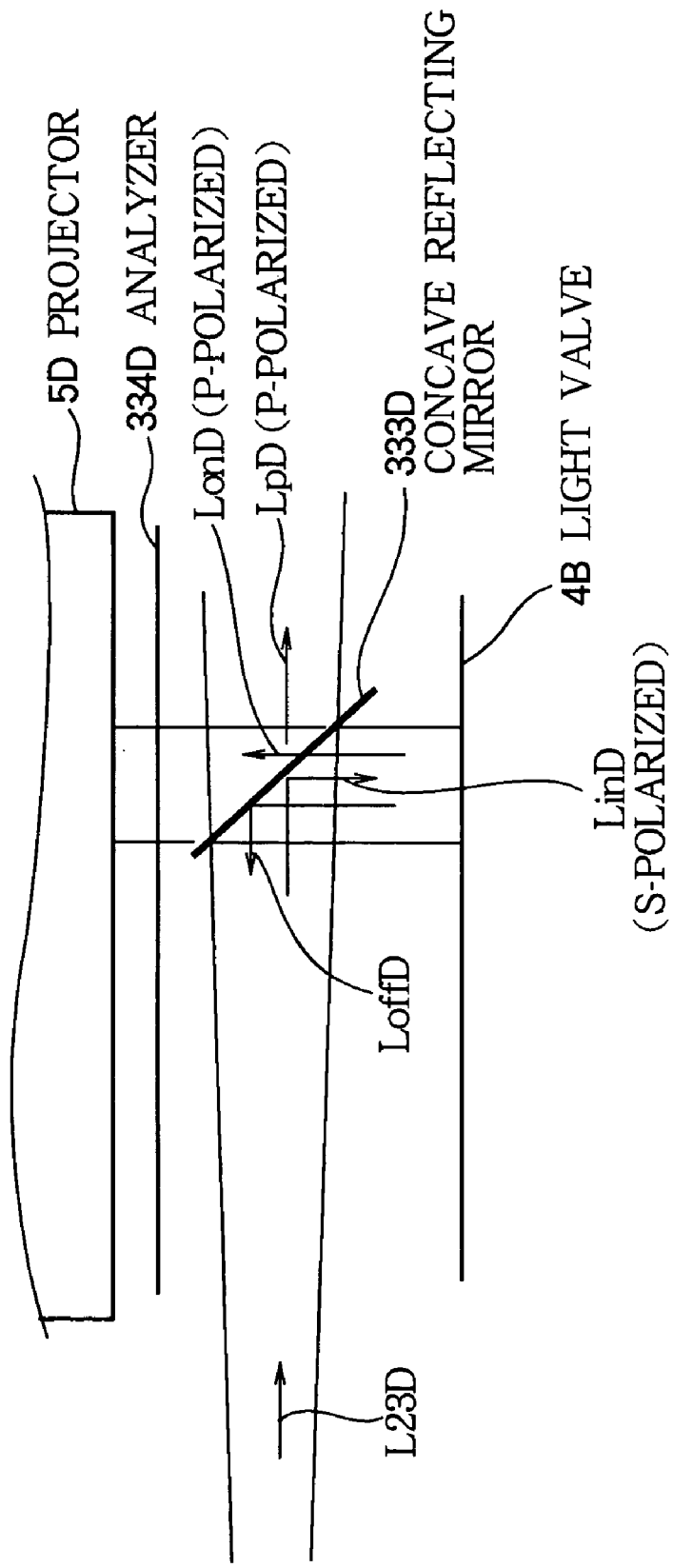
FIG. 17 is a partial expanded view illustrating the light valve and a portion near the concave reflecting mirror with the aid of light paths.

FIG. 17 is a partial expanded view illustrating the light valve 4D and a portion near the concave reflecting mirror 333D by way of light paths. The S-polarized incident light in the direction LinD illuminates the light valve 4D and is reflected by the light valve 4D to become P-polarized ON-light in the direction LonD, which is then projected. If the incident light in the direction LinD is reflected by the light valve 4D with the polarization direction unchanged, the reflected light incident on the concave reflecting mirror 333D is reflected as P-polarized light in the direction LoffD and then travels in the opposite direction to the incident light L23D. Reference numerals 334D and 5D denote an analyzer and a projector, respectively. The projector 5D is disposed opposite to the light valve 4D with said scanning mechanism positioned between said projector and said light valve 4D. The ON-light reflected by the light valve 4D in the direction LonD travels through the concave reflecting mirror 333D, then through the analyzer 334D that serves as a scanning aperture, and finally to the projector 5D. The concave reflecting mirror 333D and analyzer 334D serve as a polarization splitting means in a similar manner and have transmission axes that are parallel to each other. An image display apparatus has a contrast of preferably more than 1000:1. For this purpose, the light passes through both the concave reflecting mirror 333D and analyzer 334D for improved contrast. The OFF-light in the direction LoffD is reflected by the concave reflecting mirror 333D, then passes through the galvanometer mechanism (mirror 312) and the reflector R1, finally reaches the light-exiting window member 23 of the light cross section converter 2B for reuse. A light absorbing member (not shown) absorbs unwanted light in the direction LpD, so that the unwanted light is prevented from becoming stray light. Generally speaking, an illumination system commonly incorporates a polarization separating prism or a combination of a polarizer and an analyzer. If an illumination system incorporates a polarizer and an analyzer, the polarizer and analyzer are arranged such that their polarization directions are perpendicular to each other or parallel to each other. Because the polarization separation means (concave reflecting mirror 333D) in the fourth embodiment rotates, the analyzer 334D should preferably be rotated so that the relative positional relation between the analyzer and the polarizer is maintained. However, in the fourth embodiment, the analyzer is stationary for simple construction. This is because the polarization direction of the light that illuminates the light valve 4D is substantially constant even when the polarization separating means is rotating relative to the analyzer. Of course, a combination of a rotating analyzer and a rotating polarizer provides a smaller aperture that would minimize stray light.

Fifth Embodiment

Figure 18:
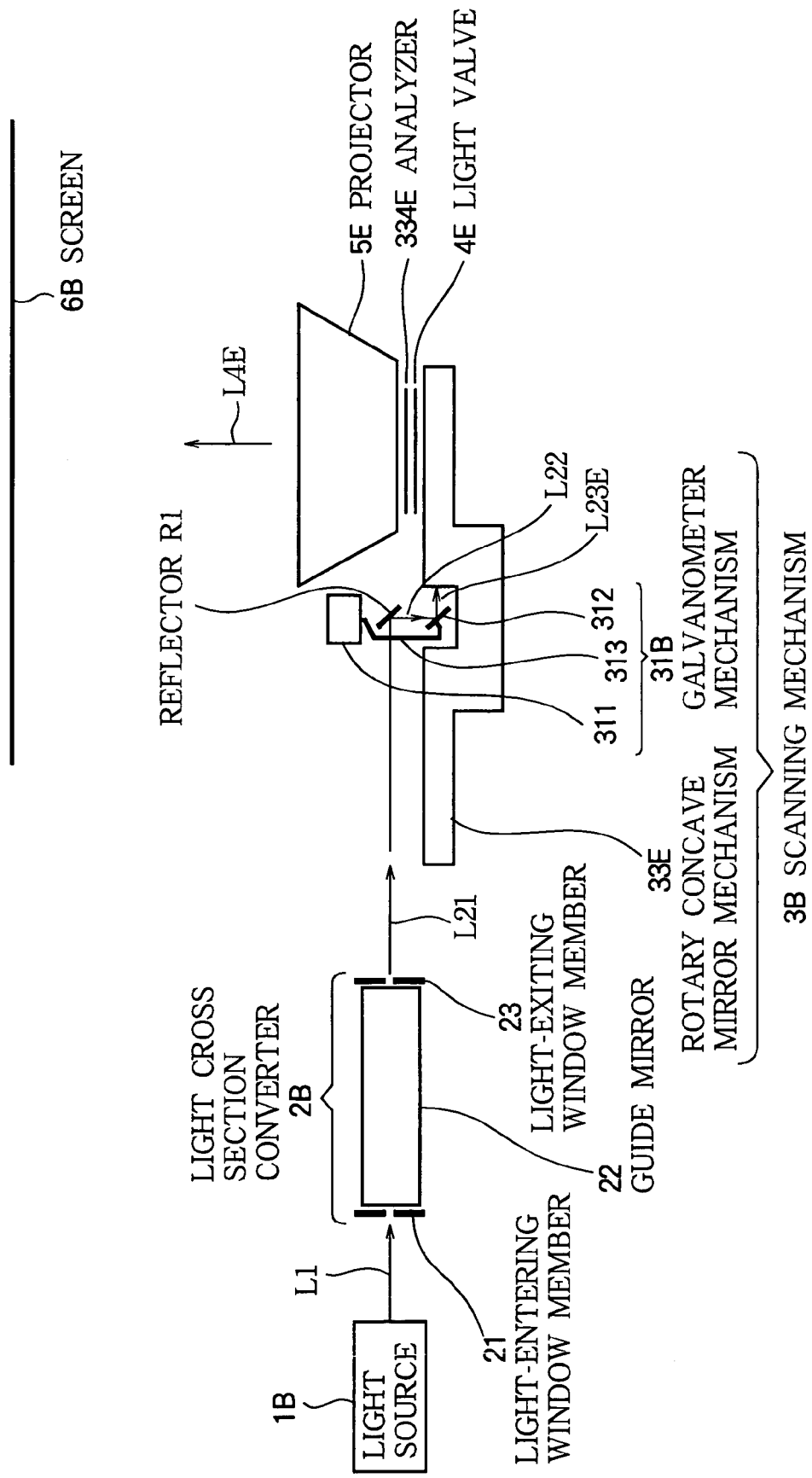
FIG. 18 illustrates the configuration of an optical means for a display apparatus according to a fifth embodiment.

FIG. 18 illustrates the configuration of an optical means for a display apparatus according to a fifth embodiment. Illumination light having a circular cross section illuminates a transmissive LCD type light valve 4E from behind while at the same time a scanning mechanism 3E causes the illumination light to scan the light valve 4E both in the x direction and in the y direction. Thus, the entire surface of the light valve 4E is illuminated uniformly. Light L23E emitted from a mirror 312 reaches a spiral rotary concave mirror of a rotary concave mirror mechanism 33E and is bent by substantially 90° toward the light valve 4E. The light valve 4E changes the polarization direction of the light incident on it, the polarization direction varying in accordance with a signal level of a pixel to be displayed. The analyzer 334E as a scanning aperture allows only light having a particular polarization direction to pass and absorbs light having other polarization directions, so that the light passing through the analyzer 334E has intensity in accordance with the signal level of a pixel to be displayed and enters the projector 5E. The projector 5R in turn projects projection light L4E onto a screen 6B.

Figure 19:
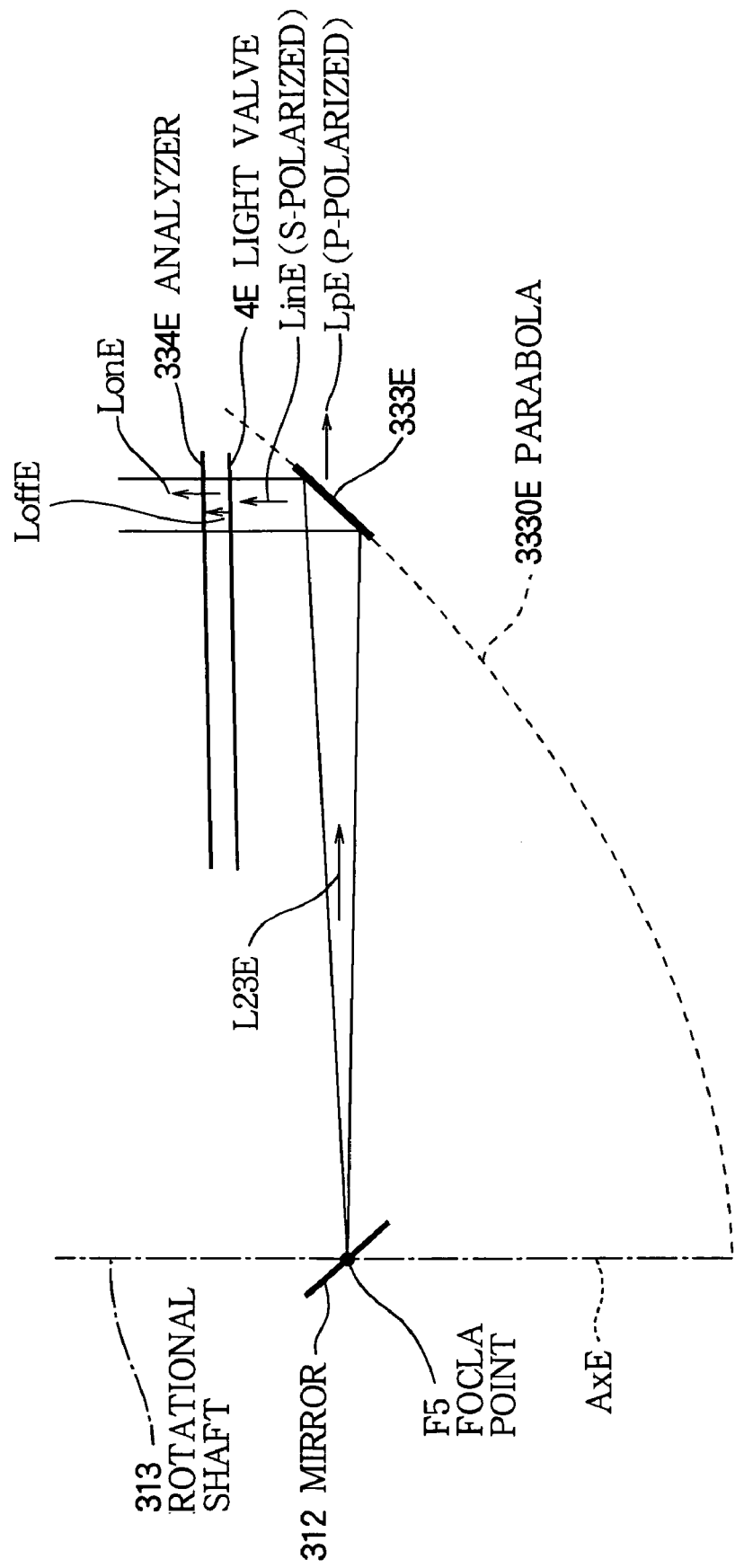
FIG. 19 is a diagrammatic representation of light paths of a display apparatus according to the fifth embodiment.

FIG. 19 is a diagrammatic representation of light paths of the display apparatus according to the fifth embodiment. A method of illuminating the light valve 4E will be described with reference to FIG. 19. Reference numerals 333E and 3330E denote a rotary concave reflecting mirror in the form of a reflection type polarization splitting means and a parabola (i.e., quadratic curve) in which the rotary reflecting mirror 333E lies. Reference numerals F5 and AxE denote a focal point of the parabola 3330E and an axis of the parabola 3330E, respectively. Part of light L23E is reflected by the rotary reflecting mirror 333E to become S-polarized light in a direction LinE that illuminates the light valve 4E. Another part of the light L23E passes through the rotary reflecting valve 4E and exits as unwanted P-polarized in a direction LpE. LonE denotes a direction of travel of ON-light whose polarization direction is changed by the light valve 4E. LoffE denotes a direction of travel of OFF-light whose polarization is not changed by the light valve 4E. Reference numeral 334E denotes an analyzer. The light L23E is reflected by the mirror 312 of the rotary concave reflecting mirror 333E positioned at the focal point F5, and is then reflected by the rotary reflecting mirror 333E to become light in the direction LinE that is parallel to the axis AxE. The light in the direction LinE then illuminates the light valve 4E. After passing through the light valve 4E, the light in the direction LonE passes through the analyzer 334E to the projector 5E. The light in the direction LoffE is absorbed into the analyzer 334E. The light absorbing member (not shown) absorbs the unwanted light in the direction LpE, preventing stray light. Absorption of the OFF-light in the direction LoffE offers an apparatus with less noise.

According to the fifth embodiment, despite the fact that the light vale 4E is a transmissive LCD type, the illumination system can be miniaturized with reduced thickness. The rotary reflecting mirror mechanism 33E causes a flow of air near the light valve 4E and analyzer 334E and therefore the apparatus can be cooled efficiently, preventing temperature rise in the apparatus and prolonging the life of the apparatus.

While the aforementioned embodiments have not addressed display of color images, color images can be displayed by means of known methods. In addition, reflection type filters for primary colors (red, green and blue) may be disposed on the side of the light valve 4E on which the illumination light traveling in the direction Lin is incident, in which case the reflected light returns to the light cross section converter 2B where some of the returned light may be reused to improve efficiency of light utilization.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A display apparatus comprising:
    a light source, emitting light;
    a light valve, having a screen formed of a plurality of pixels;
    a light cross-section converter, receiving the light from said light source and converting the received light into illumination light having a cross section enough to illuminate at least one of the plurality of pixels at a time; and
    a light scanning mechanism, controlling a direction of travel of the illumination light in such a way that the illumination light scans the plurality of pixels;
    wherein said light scanning mechanism includes a light scanning mechanism controller that controls at least one of a sequence, a speed, and a number of times of scanning where the illumination light scans the plurality of pixels, in such a way that a desired profile of distribution of illuminance is obtained over an entire surface of the screen for a time period not longer than one frame time of an image, and
    wherein said light scanning mechanism controller controls the desired profile of distribution of illuminance in accordance with a type of input signal or an application of the display apparatus.

2. The display apparatus according to claim 1, wherein at least a part of a profile of light distribution of light intensity in a cross section of the illumination light has a shape of a Gaussian beam.

3. The display apparatus according to claim 2, wherein said scanning mechanism controls scanning intervals at which the illumination light scans said light valve, the scanning intervals being greater than a Gauss radius.

4. The display apparatus according to claim 2, wherein said scanning mechanism controls scanning intervals at which the illumination light scans the plurality of pixels of said light valve, the scanning intervals being ½ of a Gauss radius.

5. The display apparatus according to claim 2, wherein scanning intervals at which the illumination light scans the plurality of pixels of said light valve are equal to a Gauss radius.

6. The display apparatus according to claim 2, wherein scanning intervals at which the illumination light scans the plurality of pixels of said light valve are varied in accordance with a type of the image.

7. The display apparatus according to claim 1, wherein at least a part of a profile of distribution of light intensity across the entire surface of the screen has a shape of a Gaussian beam.

8. The display apparatus according to claim 1, further comprising a projector that receives the illumination light exiting said light valve and projects the received illumination light onto an object;
wherein said light scanning mechanism controls scanning intervals at which the illumination light scans the plurality of pixels of said light valve, the scanning intervals being controlled in such a way that a light-incident surface of the object has a desired profile of distribution of illuminance and a light-exiting surface of the object has a desired profile of distribution of light intensity.

9. The display apparatus according to claim 8, wherein said light valve is a reflection type light valve in which the plurality of pixels are arranged in a flat plane;
wherein said projector is disposed opposite to said light valve with said scanning mechanism positioned between said projector and said light valve;
wherein said scanning mechanism has a transparent medium disposed between said light valve and said projector and causes the illumination light that exits said light cross-section converter to be incident on the plurality of pixels of said light valve;
wherein the plurality of pixels reflect the illumination light received from said scanning mechanism to said projector through the transparent medium.

10. The display apparatus according to claim 9, wherein said scanning mechanism further includes a light recovery section that recovers a portion of the illumination light for reuse, the recovered portion of the illumination light being reflected by the plurality of pixels but does not form an image,
wherein the illumination light recovered by the light recovery section is combined with the illumination light that illuminates said light valve.

11. The display apparatus according to claim 9, further comprising an aperture member through which image-forming light passes, the image forming light being a portion of illumination light reflected from said light valve.

12. The display apparatus according to claim 8, wherein said light valve is a transmissive type that has a first surface and a second surface between which the plurality of pixels are arranged in a flat plane;
wherein said projector is disposed opposite to the first surface of the light valve;
wherein said scanning mechanism is disposed opposite to the second surface of the light valve, receives the illumination light from the light cross-section converter, and causes the illumination light to scan the plurality of pixels of said light valve in such a way that the illumination light passes through the plurality of pixels.

13. The display apparatus according to claim 12, wherein said scanning mechanism includes a mirror having a reflecting surface that reflects the illumination light to said light valve,
wherein said scanning mechanism causes the reflecting surface to move substantially from a first one of first two opposite sides of said light valve to a second one of the first two opposite sides so that the illumination light scans the plurality of pixels in a first direction.

14. The display apparatus according to claim 13, wherein the mirror is a concave mirror having a reflecting surface that describes a spiral,
wherein said scanning mechanism causes the concave mirror to rotate so that the reflecting surface moves from the first one of the second two opposing sides to the second one of the second two opposing sides.

15. The display apparatus according to claim 14, wherein the reflecting surface describes a quadratic curve,
wherein said scanning mechanism causes the illumination light to emit from a focal point of the quadratic curve toward the reflecting surface.

16. The display apparatus according to claim 14, wherein when the mirror moves, the mirror agitates air near said light valve to create a flow of air to minimize temperature rise of said light valve.

17. The display apparatus according to claim 13, further comprising an aperture member having an opening formed therein,
wherein image-forming light passes through the opening, and non-image-forming light is absorbed into the aperture member,
wherein the opening is moved substantially from a first one of two opposite sides of said light valve to a second one of the two opposite sides so that the illumination light scans the plurality of pixels.

18. The display apparatus according to claim 13, wherein said scanning mechanism causes the illumination light to move from a first one of second two opposite sides of said light valve to a second one of the second two opposite sides so that the illumination light scans the plurality of pixels in a second direction.

19. The display apparatus according to claim 12, further comprising an aperture member through which image-forming light passes, the image forming light being a portion of illumination light reflected from said light valve.

20. The display apparatus according to claim 1, wherein the light valve is scanned with the illumination light having a higher profile of distribution of intensity in the middle portion of the screen than in the peripheral portion of the screen if the input signal is a television signal.

21. The display apparatus according to claim 1, wherein the light valve is scanned with the illumination light having uniform intensity across the entire surface of the screen if the input signal is a computer display signal.

* * * * *